US012732944B2

(12) United States Patent
Dai et al.

(10) Patent No.: US 12,732,944 B2
(45) Date of Patent: Sep. 8, 2026

(54) SIDELINK POSITIONING REFERENCE SIGNAL RESOURCE CONFIGURATION

(71) Applicant: QUALCOMM Incorporated, San Diego, CA (US)

(72) Inventors: Jing Dai, Beijing (CN); Alexandros Manolakos, Escondido, CA (US); Kianoush Hosseini, San Diego, CA (US); Chao Wei, Beijing (CN); Weimin Duan, San Diego, CA (US); Hao Xu, Beijing (CN)

(73) Assignee: QUALCOMM Incorporated, San Diego, CA (US)

(*) Notice: Subject to any disclaimer, the term of this patent is extended or adjusted under 35 U.S.C. 154(b) by 339 days.

(21) Appl. No.: 18/547,737

(22) PCT Filed: Apr. 1, 2021

(86) PCT No.: PCT/CN2021/084931

§ 371 (c)(1),
(2) Date: Aug. 24, 2023

(87) PCT Pub. No.: WO2022/205307

PCT Pub. Date: Oct. 6, 2022

(65) Prior Publication Data

US 2024/0155546 A1 May 9, 2024

(51) Int. Cl.
*H04W 64/00* (2009.01)
*H04L 5/00* (2006.01)
(Continued)

(52) U.S. Cl.
CPC ........... *H04W 64/00* (2013.01); *H04L 5/0051* (2013.01); *H04W 24/10* (2013.01); *H04W 92/18* (2013.01)

(58) Field of Classification Search
CPC ..... H04W 64/00; H04W 24/10; H04W 92/18; H04W 4/02; H04W 24/08; H04L 5/0051;
(Continued)

(56) References Cited

U.S. PATENT DOCUMENTS 12,538,256 B2 * 1/2026 Baek .................... H04L 5/0051
2016/0095080 A1 3/2016 Khoryaev et al.
(Continued)

FOREIGN PATENT DOCUMENTS

| | | |
|---|---|---|
| CN | 112203223 A | 1/2021 |
| WO | WO-2020256311 A1 | 12/2020 |
| WO | 2021034076 A1 | 2/2021 |

OTHER PUBLICATIONS

International Search Report and Written Opinion—PCT/CN2021/084931—ISA/EPO—Jan. 6, 2022.
(Continued)

*Primary Examiner* — Kabir A Timory
(74) *Attorney, Agent, or Firm* — Thien T. Nguyen

(57) ABSTRACT

Disclosed are techniques for communication. In an aspect, a position estimation entity determines a sidelink positioning reference signal (SL-PRS) resource configuration associated with a positioning measurement procedure. The position estimation entity transmits an indication of the SL-PRS resource configuration (e.g., to first and/or second UEs). The UE(s) obtain the SL-PRS resource configuration, and perform the positioning measurement procedure in accordance with the SL-PRS resource configuration.

56 Claims, 17 Drawing Sheets

(51) Int. Cl.
*H04W 24/10* (2009.01)
*H04W 92/18* (2009.01)

(58) Field of Classification Search
CPC ... H04L 5/0048; H04L 5/0053; H04L 5/0094; G01S 5/0205; G01S 5/0236; G01S 5/0284; G01S 5/02521; H04B 17/254
See application file for complete search history.

(56) References Cited

U.S. PATENT DOCUMENTS

| | | | | |
|---|---|---|---|---|
| 2019/0045477 | A1 | 2/2019 | Edge | |
| 2022/0361142 | A1 | 11/2022 | Ko et al. | |
| 2024/0023050 | A1 | 1/2024 | Zhao | |
| 2024/0235766 | A9 * | 7/2024 | Ganesan | H04L 5/005 |

OTHER PUBLICATIONS

Robert Bosch Gmbh: “Discussion on Positioning Use Cases and Requirements for V2X,” 3GPP TSG-RAN Meeting #91-e, RP-210658, Electronic Meeting, Mar. 16-26, 2021, (Mar. 26, 2021) ,8 pages, the whole document.
Supplementary European Search Report—EP21933966—Search Authority—Munich—Dec. 2, 2024.

* cited by examiner

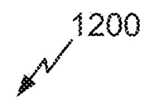

OBTAINING A SIDELINK POSITIONING REFERENCE SIGNAL (SL-PRS) RESOURCE CONFIGURATION ASSOCIATED WITH A POSITIONING MEASUREMENT PROCEDURE THAT COMPRISES A FIRST SL-PRS BETWEEN THE FIRST UE AND A SECOND UE IN A FIRST TRANSMISSION DIRECTION, A SECOND SL-PRS BETWEEN THE FIRST UE AND THE SECOND UE IN THE FIRST TRANSMISSION DIRECTION THAT IS OFFSET IN TIME FROM THE FIRST SL-PRS BY A TIME OFFSET, AND A THIRD SL-PRS BETWEEN THE FIRST UE AND THE SECOND UE IN A SECOND TRANSMISSION DIRECTION

1210

PERFORMING THE POSITIONING MEASUREMENT PROCEDURE WITH THE SECOND UE IN ACCORDANCE WITH THE SL-PRS RESOURCE CONFIGURATION

SIDELINK POSITIONING REFERENCE SIGNAL RESOURCE CONFIGURATION

CROSS-REFERENCE TO RELATED APPLICATION

The present Application for Patent is a national stage application, filed under 35 U.S.C. § 371, of International Patent Application No. PCT/CN2021/084931, entitled, "SIDELINK POSITIONING REFERENCE SIGNAL RESOURCE CONFIGURATION", filed Apr. 1, 2021, which is assigned to the assignee hereof and is expressly incorporated herein by reference in its entirety.

BACKGROUND OF THE DISCLOSURE

1. Field of the Disclosure

Aspects of the disclosure relate generally to wireless communications.

2. Description of the Related Art

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (TDMA), time division multiple access (TDMA), the Global System for Mobile communications (GSM), etc.

A fifth generation (5G) wireless standard, referred to as New Radio (NR), calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

Leveraging the increased data rates and decreased latency of 5G, among other things, vehicle-to-everything (V2X) communication technologies are being implemented to support autonomous driving applications, such as wireless communications between vehicles, between vehicles and the roadside infrastructure, between vehicles and pedestrians, etc.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of operating a first user equipment (UE) includes obtaining a sidelink positioning reference signal (SL-PRS) resource configuration associated with a positioning measurement procedure that comprises a first SL-PRS between the first UE and a second UE a first transmission direction, a second SL-PRS between the first UE and the second UE in the first transmission direction that is offset in time from the first SL-PRS by a time offset, and a third SL-PRS between the first UE and the second UE in a second transmission direction; and performing the positioning measurement procedure with the second UE in accordance with the SL-PRS resource configuration.

In some aspects, the SL-PRS resource configuration is determined independently at the first UE and transmitted to the second UE, or the SL-PRS resource configuration is received from the second UE.

In some aspects, the first transmission direction is from the first UE to the second UE, such the first and second SL-PRSs are transmitted from the first UE to the second UE and the third SL-PRS is transmitted from the second UE to the first UE.

In some aspects, the first transmission direction is from the second UE to the first UE, such the first and second SL-PRSs are transmitted from the second UE to the first UE and the third SL-PRS is transmitted from the first UE to the second UE.

In some aspects, the positioning measurement procedure includes measuring at least one receive-transmit (Rx-Tx) time difference associated with at least one of the first, second and third SL-PRSs.

In some aspects, the third SL-PRS is earlier than the first and second SL-PRSs, or the third SL-PRS is later than the first and second SL-PRSs, or wherein the third SL-PRS is between than the first and second SL-PRSs.

In some aspects, the SL-PRS resource configuration is determined independently at the first UE and transmitted to the second UE, and an earliest of the first, second and third SL-PRSs is transmitted by the first UE, or the SL-PRS resource configuration is received from the second UE, and the earliest of the first, second and third SL-PRSs is received at the first UE from the second UE.

In some aspects, the first, second and third SL-PRSs are scheduled aperiodically, semi-periodically, or periodically.

In some aspects, the method includes transmitting a measurement report comprising measurement information that is based on one or more receive-transmit (Rx-Tx) time differences associated with one or more of the first, second and third SL-PRSs.

In some aspects, the one or more Rx-Tx time differences associated with the first and second. SL-PRSs in the measurement report are based on timestamps derived on the same time basis.

In some aspects, the first and second SL-PRSs are transmitted based on the same time basis.

In some aspects, the first, second and third SL-PRSs are scheduled periodically.

In some aspects, the first, second and third SL-PRSs are scheduled with the same respective periodicity.

In some aspects, the time offset between the first and second SL-PRSs corresponds to half of the respective periodicity.

In some aspects, the SL-PRS resource configuration is asymmetric such that a first time differential between the third SL-PRS and the first SL-PRS is different than a second time differential between the third SL-PRS and the second SL-PRS.

In some aspects, the time offset is greater than a minimum time offset threshold associated with the asymmetric SL-PRS resource configuration.

In some aspects, the minimum time offset threshold is based on a bandwidth associated with the first and second SL-PRSs.

In an aspect, a method of operating a position estimation entity includes determining a sidelink positioning reference signal (SL-PRS) resource configuration associated with a positioning measurement procedure that comprises a first SL-PRS between a first user equipment (UE) and a second UE in a first transmission direction, a second SL-PRS between the first UE and the second UE in the first transmission direction that is offset in time from the first SL-PRS by a time offset, and a third SL-PRS between the first UE and the second UE in a second transmission direction; and transmitting an indication of the SL-PRS resource configuration.

In some aspects, the position estimation entity corresponds to the first UE, the second UE, a base station, a location server, or a location management function (LMF).

In some aspects, the method includes receiving, from the first UE or the second UE, a measurement report comprising measurement information that is based on a first receive-transmit (Rx-Tx) time difference associated with the first PRS by and a second Rx-Tx time difference associated with the second PRS in accordance with the SL-PRS resource configuration.

In some aspects, the first and second SL-PRSs are transmitted based on the same time basis.

In some aspects, the method includes determining a clock drift between the first and second Rx-Tx time differences; and determining a position estimate of one of the first and second UEs based at least in part upon the clock drift.

In some aspects, the first transmission direction is from the first UE to the second UE, such the first and second SL-PRSs are transmitted from the first UE to the second UE and the third SL-PRS is transmitted from the second UE to the first UE.

In some aspects, the first transmission direction is from the second UE to the first UE, such the first and second SL-PRSs are transmitted from the second UE to the first UE and the third SL-PRS is transmitted from the first UE to the second UE.

In some aspects, the third SL-PRS is earlier than the first and second SL-PRSs, or the third SL-PRS is later than the first and second SL-PRSs, or wherein the third SL-PRS is between than the first and second SL-PRSs.

In some aspects, the position estimation entity corresponds to the first UE, and an earliest of the first, second and third SL-PRSs is transmitted by the first UE, or the position estimation entity corresponds to the second UE, and the earliest of the first, second and third, SL-PRSs is received at the first UE from the second UE.

In some aspects, the SL-PRS resource configuration is asymmetric such that a first time differential between the third SL-PRS and the first SL-PRS is different than a second time differential between the third SL-PRS and the second SL-PRS.

In some aspects, the SL-PRS resource configuration is symmetric such that a first time differential between the third SL-PRS and the first SL-PRS is the same as a second time differential between the third SL-PRS and the second SL-PRS.

In an aspect, a first user equipment (UE) includes a memory; a communication interface, and at least one processor communicatively coupled to the memory and the communication interface, the at least one processor configured to: obtain a sidelink positioning reference signal (SL-PRS) resource configuration associated with a positioning measurement procedure that comprises a first SL-PRS between the first UE and a second UE in a first transmission direction, a second SL-PRS between the first UE and the second UE in the first transmission direction that is offset in time from the first SL-PRS bar a time offset, and a third SL-PRS between the first UE and the second UE in a second transmission direction; and perform the positioning measurement procedure with the second UE in accordance with the SL-PRS resource configuration.

In some aspects, the SL-PRS resource configuration is determined independently at the first UE and transmitted to the second UE, or the SL-PRS resource configuration is received from the second UE.

In some aspects, the first transmission direction is from the first UE to the second UE, such the first and second SL-PRSs are transmitted from the first UE to the second UE and the third SL-PRS is transmitted from the second UE to the first UE.

In some aspects, the first transmission direction is from the second UE to the first UE, such the first and second SL-PRSs are transmitted from the second UE to the first UE and the third SL-PRS is transmitted from the first UE to the second UE.

In some aspects, the positioning measurement procedure includes measuring at least one receive-transmit (Rx-Tx) time difference associated with at least one of the first, second and third SL-PRSs.

In some aspects, the third SL-PRS is earlier than the first and second SL-PRSs, or the third SL-PRS is later than the first and second SL-PRSs, or wherein the third SL-PRS is between than the first and second SL-PRSs.

In some aspects, the SL-PRS resource configuration is determined independently at the first UE and transmitted to the second UE, and an earliest of the first, second and third SL-PRSs is transmitted by the first UE, or the SL-PRS resource configuration is received from the second UE, and the earliest of the first, second and third SL-PRSs is received at the first UE from the second UE.

In some aspects, the first, second and third SL-PRSs are scheduled aperiodically, semi-periodically, or periodically.

In some aspects, the at least one processor is further configured to: cause the communication interface to transmit a measurement report comprising, measurement information that is based on one or more receive-transmit (Rx-Tx) time differences associated with one or more of the first, second and third SL-PRSs.

In some aspects, the one or more Rx-Tx time differences associated with the first and second SL-PRSs in the measurement report are based on timestamps derived on the same time basis.

In some aspects, the first and second SL-PRSs are transmitted based on the same time basis.

In some aspects, the first, second and third SL-PRSs are scheduled periodically.

In some aspects, the first, second and third SL-PRSs are scheduled with the same respective periodicity.

In some aspects, the time offset between the first and second SL-PRSs corresponds to half of the respective periodicity.

In some aspects, the SL-PRS resource configuration is asymmetric such that a first time differential between the third SL-PRS and the first SL-PRS is different than a second time differential between the third SL-PRS and the second SL-PRS.

In some aspects, the time offset is greater than a minimum time offset threshold associated with the asymmetric SL-PRS resource configuration.

In some aspects, the minimum time offset threshold is based on a bandwidth associated with the first and second SL-PRSs.

In an aspect, a position estimation entity includes a memory, a communication interface; and at least one processor communicatively coupled to the memory and the communication interface, the at least one processor configured to: determine a sidelink positioning reference signal (SL-PRS) resource configuration associated with a positioning measurement procedure that comprises a first SL-PRS between a first user equipment (UE) and a second UE in a first transmission direction, a second SL-PRS between the first UE and the second UE in the first transmission direction that is offset in time from the first SL-PRS by a time offset, and a third SL-PRS between the first UE and the second UE in a second transmission direction; and cause the communication interface to transmit an indication of the SL-PRS resource configuration.

In some aspects, the position estimation entity corresponds to the first UE, the second UE, a base station, a location server, or a location management function (LMF).

In some aspects, the at least one processor is farther configured to: receive, via the communication interface, from the first UE or the second UE, a measurement report comprising measurement information that is based on a first receive-transmit (Rx-Tx) time difference associated with the first PRS by and a second Rx-Tx time difference associated with the second PRS in accordance with the SL-PRS resource configuration.

In some aspects, the first and second SL-PRSs are transmitted based on the same time basis.

In some aspects, the at least one processor is further configured to: determine a clock drift between the first and second Rx-Tx tune differences; and determine a position estimate of one of the first and second UEs based at least in part upon the clock drift.

In some aspects, the first transmission direction is from the first UE to the second UE, such the first and second SL-PRSs are transmitted from the first UE to the second UE and the third SL-PRS is transmitted from the second UE to the first UE.

In some aspects, the first transmission direction is from the second UE to the first UE, such the first and second SL-PRSs are transmitted from the second UE to the first UE and the third SL-PRS is transmitted from the first UE to the second UE.

In some aspects, the third SL-PRS is earlier than the first and second SL-PRSs, or the third SL-PRS is later than the first and second SL-PRSs, or wherein the third SL-PRS is between than the first and second SL-PRSs.

In some aspects, the position estimation entity corresponds to the first UE, and an earliest of the first, second and third SL-PRSs is transmitted by the first UE, or the position estimation entity corresponds to the second UE, and the earliest of the first, second and third SL-PRSs is received at the first UE from the second UE.

In some aspects, the SL-PRS resource configuration is asymmetric such that a first time differential between the third SL-PRS and the first SL-PRS is different than a second time differential between the third SL-PRS and the second SL-PRS.

In some aspects, the SL-PRS resource configuration is symmetric such that a first time differential between the third SL-PRS and the first SL-PRS is the same as a second time differential between the third SL-PRS and the second SL-PRS.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

FIG. 12 illustrates an exemplary process of wireless communication, according to aspects of the disclosure.

DETAILED DESCRIPTION

Figure 1:
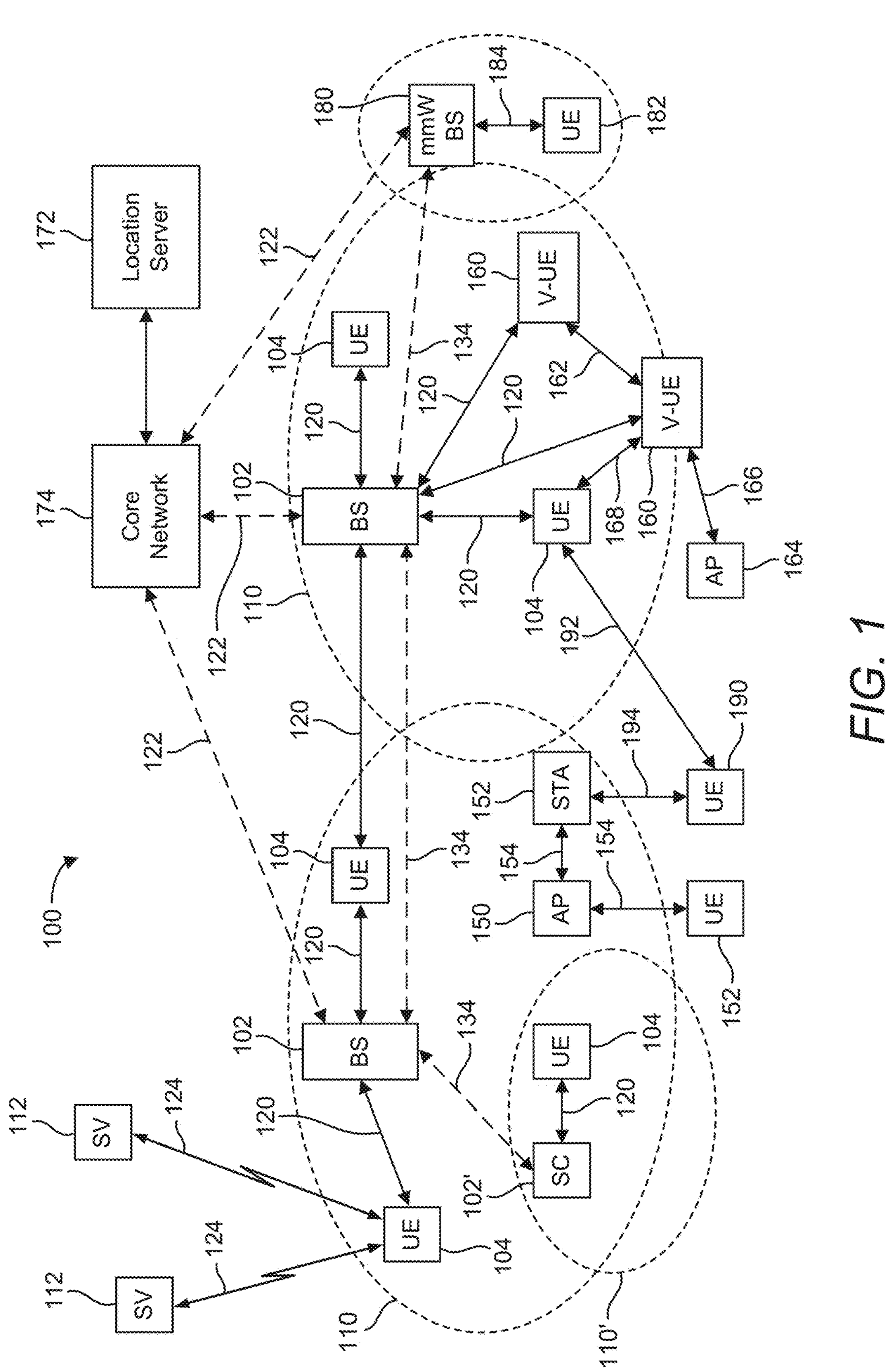
FIG. 1 illustrates an example wireless communications system, according to aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE), "vehicle UE" (V-UE), "pedestrian UE" (P-UE), and "base station" are not intended to be specific or otherwise limited to any particular radio access technology (RAT), unless otherwise noted. In general, a UE may be any wireless communication device (e.g., vehicle on-board computer, vehicle navigation device, mobile phone, router, tablet computer, laptop computer, asset locating device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as a "mobile device," an "access terminal" or "AT," a "client device," a "wireless device," a "subscriber device," a "subscriber terminal," a "subscriber station," a "user terminal" or UT, a "mobile terminal," a "mobile station." or variations thereof.

A V-UE is a type of UE and may be any in-vehicle wireless communication device, such as a navigation system, a warning system, a heads-up display (HUD), an on-board computer, an in-vehicle information system, an automated driving system (ADS), an advanced driver assistance system (ADAS), etc. Alternatively, a V-UE may be a portable wireless communication device (e.g., a cell phone, tablet computer, etc.) that is carried by the driver of the vehicle or a passenger in the vehicle. The term "V-UE" may refer to the in-vehicle wireless communication device or the vehicle itself, depending on the context. A P-UE is a type of UE and may be a portable wireless communication device that is carried by a pedestrian (i.e., a user that is not driving or riding in a vehicle). Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on Institute of Electrical and Electronics Engineers (IEEE) 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs including supporting data, voice and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either UL/reverse or DL/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference RF signals to UEs to be measured by the UEs and/or may receive and measure signals transmitted by the UEs. Such base stations may be referred to as positioning beacons (e.g., when transmitting RF signals to UEs) and/or as location measurement units (e.g., when receiving and measuring RF signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

FIG. 1 illustrates an example wireless communications system 100, according to aspects of the disclosure. The wireless communications system 100 (which may also be referred to as a wireless wide area network (WWAN)) may include various base stations 102 (labelled "BS") and various UEs 104. The base stations 102 may include macro cell base stations (high power cellular base stations) and/or small cell base stations (low power cellular base stations). In an aspect, the macro cell base stations 102 may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 174 (e.g., an evolved packet core (EPC) or 5G core (5GC)) through backhaul links 122, and through the core network 174 to one or more location servers 172 (e.g., a location management function (LMF) or a secure user plane location (SUPL) location platform (SLP)). The location server(s) 172 may be part of core network 174 or may be external to core network 174. In addition to oilier functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), an enhanced cell identifier (ECI), a virtual cell identifier (VCI), a cell global identifier (CGI), etc.) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both the logical communication entity and the base station that supports it, depending on the context. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' (labelled "SC" for "small cell") may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a mmW base station 180 that may operate in millimeter wave (mmW) frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) hand extends between 3 GHz and 30 GHz, also referred to as centimeter wave. Communications using the mmW/near mmW radio frequency band have high path loss and a relatively short range. The inn base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mini or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-co-located, meaning that they appear to the receiver (e.g., a UE) as having the same parameters, regardless of whether or not the transmitting antennas of the network node themselves are physically co-located. In NR, there are four types of quasi-co-location (QCL) relations. Specifically, a QCL relation of a given type means that certain parameters about a second reference RF signal on a second beam can be derived from information about a source reference RF signal on a source beam, Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL. Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF; signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength reference signal received power (RSRP), reference signal received quality (RSRQ), signal-to-interference-plus-noise ratio (SINR), etc.) of the RF signals received from that direction.

Transmit and receive beams may be spatially related. A spatial relation means that parameters for a second beam (e.g., a transmit or receive beam) for a second reference signal can be derived from information about a first beam (e.g., a receive beam or a transmit beam) for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). mmW frequency bands generally include the FR2, FR3, and FR4 frequency ranges. As such, the terms "mmW" and "FR2" or "FR3" or "FR4" may generally be used interchangeably.

In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"), The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

In the example of FIG. 1, one or more Earth orbiting satellite positioning system (SPS) space vehicles (SVs) 112 (e.g., satellites) may be used as an independent source of location information for any of the illustrated UEs (shown in FIG. 1 as a single UE 104 for simplicity). A UE 104 may include one or more dedicated SPS receivers specifically designed to receive SPS signals 124 for deriving geo location information from the SVs 112. An SPS typically includes a system of transmitters (e.g., SVs 112) positioned to enable receivers (e.g., UEs 104) to determine their location on or above the Earth based, at least in part, on signals (e.g., SPS signals 124) received from the transmitters. Such a transmitter typically transmits a signal marked with a repeating pseudo-random noise (PN) code of a set number of chips. While typically located in SVs 112, transmitters may sometimes be located on ground-based control stations, base stations 102, and/or other UEs 104.

The use of SPS signals 124 can be augmented by various satellite-based augmentation systems (SBAS) that may be associated with or otherwise enabled for use with one or more global and/or regional navigation satellite systems. For example an SBAS may include an augmentation system(s) that provides integrity information, differential corrections, etc., such as the Wide Area Augmentation System (WAAS), the European Geostationary Navigation Overlay Service (EGNOS), the Multi-functional Satellite Augmentation System (MSAS), the Global Positioning System (GPS) Aided Geo Augmented Navigation or (IPS and Geo Augmented Navigation system (GAGAN), and/or the like. Thus, as used herein, an SPS may include any combination of one or more global and/or regional navigation satellite systems and/or augmentation systems, and SPS signals 124 may include SPS, SPS-like, and/or other signals associated with such one or more SPS.

Leveraging the increased data rates and decreased latency of NR, among other things, vehicle-to-everything (V2X) communication technologies are being implemented to support intelligent transportation systems (ITS) applications, such as wireless communications between vehicles (vehicle-to-vehicle (V2V)), between vehicles and the roadside infrastructure (vehicle-to-infrastructure (V2I)), and between vehicles and pedestrians (vehicle-to-pedestrian (V2P)). The goal is for vehicles to be able to sense the environment around them and communicate that information to other vehicles, infrastructure, and personal mobile devices. Such vehicle communication will enable safety, mobility, and environmental advancements that current technologies are unable to provide. Once fully implemented, the technology is expected to reduce unimpaired vehicle crashes by 80%.

Still referring to FIG. 1, the wireless communications system 100 may include multiple V-UEs 160 that may communicate with base stations 102 over communication links 120 (e.g., using the Uu interface). V-UEs 160 may also communicate directly with each other over a wireless sidelink 162, with a roadside access point 164 (also referred to as a "roadside unit") over a wireless sidelink 166, or with UEs 104 over a wireless sidelink 168. A wireless sidelink (or just "sidelink") is an adaptation of the core cellular (e.g., LTE, NR) standard that allows direct communication between two or more UEs without the communication needing to go through a base station. Sidelink communication may be unicast or multicast, and may be used for device-to-device (D2D) media-sharing, V2V communication, V2X communication (e.g., cellular V2X (cV2X) communication, enhanced V2X (eV2X) communication, etc.), emergency rescue applications, etc. One or more of a group of V-UEs 160 utilizing sidelink communications may be within the geographic coverage area 110 of a base station 102. Other V-UEs 160 in such a group may be outside the geographic coverage area 110 of a base station 102 or be otherwise unable to receive transmissions from a base station 102. In some cases, groups of V-UEs 160 communicating via sidelink communications may utilize a one-to-many (1:M) system in which each V-UE 160 transmits to every other V-UE 160 in the group. In some cases, a base station 102 facilitates the scheduling of resources for sidelink communications. In other cases, sidelink communications are carried out between V-UEs 160 without the involvement of a base station 102.

In an aspect, the sidelinks 162, 166, 168 may operate over a wireless communication medium of interest, which may be shared with other wireless communications between other vehicles and/or infrastructure access points, as well as other RATs. A "medium" may be composed of one or more time, frequency, and/or space communication resources (e.g., encompassing one or more channels across one or more carriers) associated with wireless communication between one or more transmitter/receiver pairs.

In an aspect, the sidelinks 162, 166, 168 may be cV2X links, A first generation of cV2X has been standardized in LTE, and the next generation is expected to be defined in NR. cV2X is a cellular technology that also enables device-to-device communications. In the U.S. and Europe, cV2X is expected to operate in the licensed ITS band in sub-6 GHz. Other bands may be allocated in other countries. Thus, as a particular example, the medium of interest utilized by sidelinks 162, 166, 168 may correspond to at least a portion of the licensed ITS frequency band of sub-6 GHz. However, the present disclosure is not limited to this frequency band or cellular technology.

In an aspect, the sidelinks 162, 166, 168 may be dedicated short-range communications (DSRC) links. DSRC is a one-way or two-way short-range to medium-range wireless communication protocol that uses the wireless access for vehicular environments (WAVE) protocol, also known as IEEE 802.11p, for V2V, V2I, and V2P communications. IEEE 802.11p is an approved amendment to the IEEE 802.11 standard and operates in the licensed ITS band of 5.9 GHz (5.85-5.925 GHz) in the U.S. In Europe, IEEE 802.11p operates in the ITS G5A band (5.875-5.905 MHz). Other bands may be allocated in other countries. The V2V communications briefly described above occur on the Safety Channel, which in the U.S. is typically a 10 MHz channel that is dedicated to the purpose of safety. The remainder of the DSRC band (the total bandwidth is 75 MHz) is intended for other services of interest to drivers, such as road rules, tolling, parking automation, etc. Thus, as a particular example, the mediums of interest utilized by sidelinks 162, 166, 168 may correspond to at least a portion of the licensed ITS frequency band of 5.9 GHz.

Alternatively, the medium of interest may correspond to at least a portion of an unlicensed frequency band shared among various RATs. Although different licensed frequency bands have been reserved for certain communication systems (e.g., by a government entity such as the Federal Communications Commission (FCC) in the United States), these systems, in particular those employing small cell access points, have recently extended operation into unlicensed frequency bands such as the Unlicensed National Information Infrastructure (U-NII) band used by wireless local area network (WLAN) technologies, most notably IEEE 802.11x WLAN technologies generally referred to as Example systems of this type include different variants of CDMA systems, TDMA systems, FDMA systems, orthogonal FDMA (OFDMA) systems, single-carrier FDMA (SC-FDMA) systems, and so on.

Communications between the V-UEs 160 are referred to as V2V communications, communications between the V-UEs 160 and the one or more roadside access points 164 are referred to as V2I communications, and communications between the V-UEs 160 and one or more CIEs 104 (where the UEs 104 are P-UEs) are referred to as V2P communications. The V2V communications between V-UEs 160 may include, for example, information about the position, speed, acceleration, heading, and other vehicle data of the V-UEs 160. The V2I information received at a V-UE 160 from the one or more roadside access points 164 may include, for example, road rules, parking automation information, etc. The V2P communications between a V-UE 160 and a UE 104 may include information about, for example, the position, speed, acceleration, and heading of the V-UE 160 and the position, speed (e.g., where the UE 104 is carried by a user on a bicycle), and heading of the UE 104.

Note that although FIG. 1 only illustrates two of the UEs as V-UEs (V-UEs 160), any of the illustrated UEs (e.g., UEs 104, 152, 182, 190) may be V-UEs. In addition, while only the V-UEs 160 and a single UE 104 have been illustrated as being connected over a sidelink, any of the UEs illustrated in FIG. 1, whether V-UEs, P UEs, etc., may be capable of sidelink communication. Further, although only UE 182 was described as being capable of beam forming, any of the illustrated UEs, including V-UEs 160, may be capable of beam forming. Where V-UEs 160 are capable of beam forming, they may beam form towards each other (i.e., towards other V-UEs 160), towards roadside access points 164, towards other UEs (e.g., UEs 104, 152, 182, 190), etc. Thus, in some cases. V-UEs 160 may utilize beamforming over sidelinks 162, 166, and 168.

The wireless communications system 100 may further include one or more UEs, such as UE 190, that connects indirectly to one or more communication networks via one or more device-to-device (D2D) peer-to-peer (P2P) links. In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity), In an example, the D2D P2P links 192 and 194 may be supported with any well-known D2D RAT, such as LTE Direct (LTE-D), WiFi Direct (WiFi-D), Bluetooth®, and so on. As another example, the D2D P2P links 192 and 194 may be sidelinks, as described above with reference to sidelinks 162, 166, and 168.

Figure 2A:
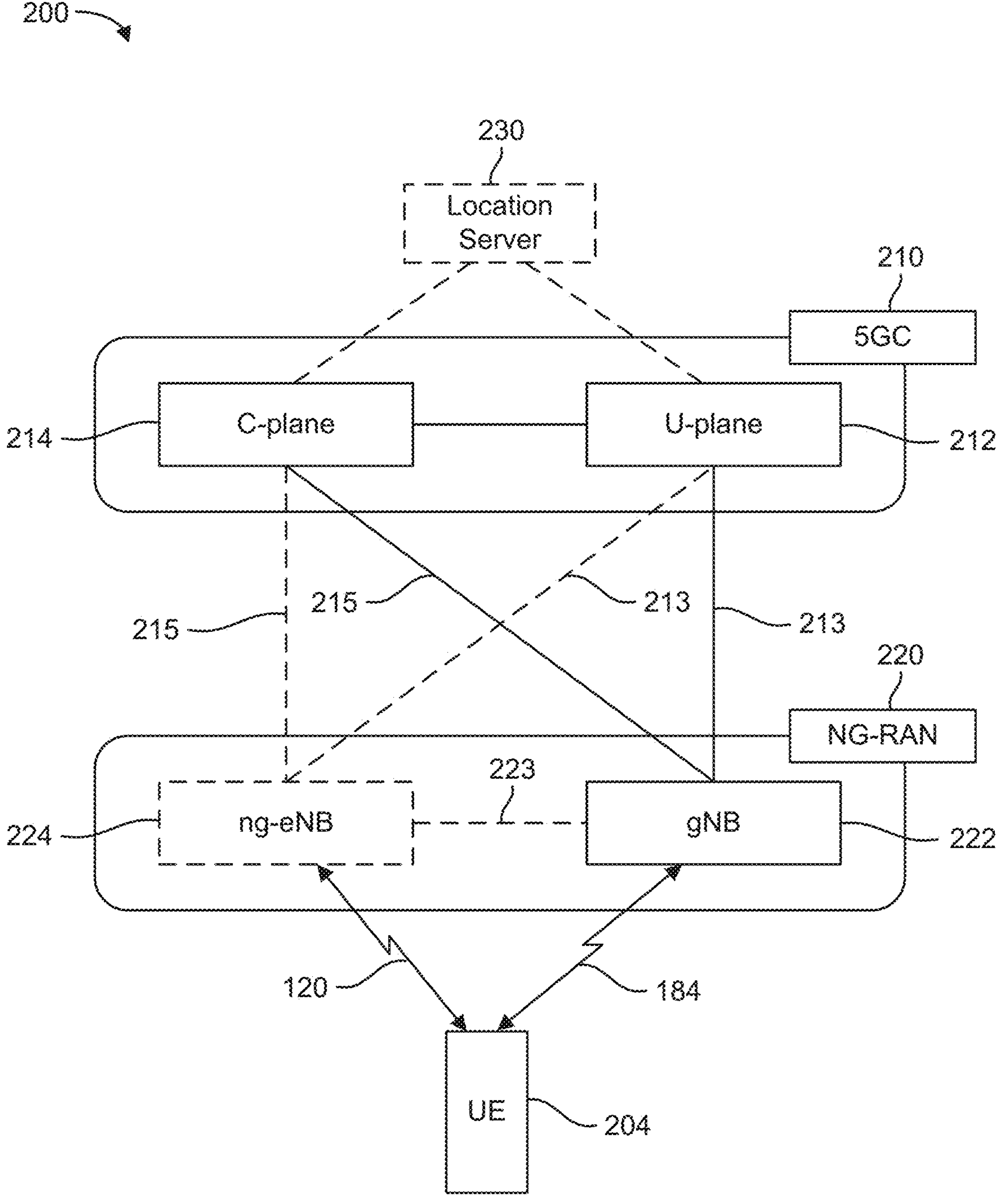
FIGS. 2A and 2B illustrate example wireless network structures, according to aspects of the disclosure.

FIG. 2A illustrates an example wireless network structure 200. For example, a 5GC 210 (also referred to as a Next Generation Core (NGC)) can be viewed functionally as control plane (C-plane) functions 214 (e.g., UE registration, authentication, network access, gateway selection, etc.) and user plane (U-plane) functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the user plane functions 212 and control plane functions 214, respectively. In an additional configuration, an ng-eNB 224 may also be connected to the 5GC 210 via. NG-C 215 to the control plane functions 214 and NG-U 213 to user plane functions 212. Further, ng-eNB 224 may directly communicate with gNB 222 via a backhaul connection 223. In some configurations, a Next Generation RAN (NG-RAN) 220 may have one or more gNBs 222, while other configurations include one or more of both ng-eNBs 224 and gNBs 222. Either (or both) gNB 222 or ng-eNB 224 may communicate with one or more UEs 204 (e.g., any of the UEs described herein).

Another optional aspect may include a location server 230, which may be in communication with the 5GC 210 to provide location assistance for UE(s) 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network (e.g., a third party server, such as an original equipment manufacturer (OEM) server or service server).

Figure 2B:
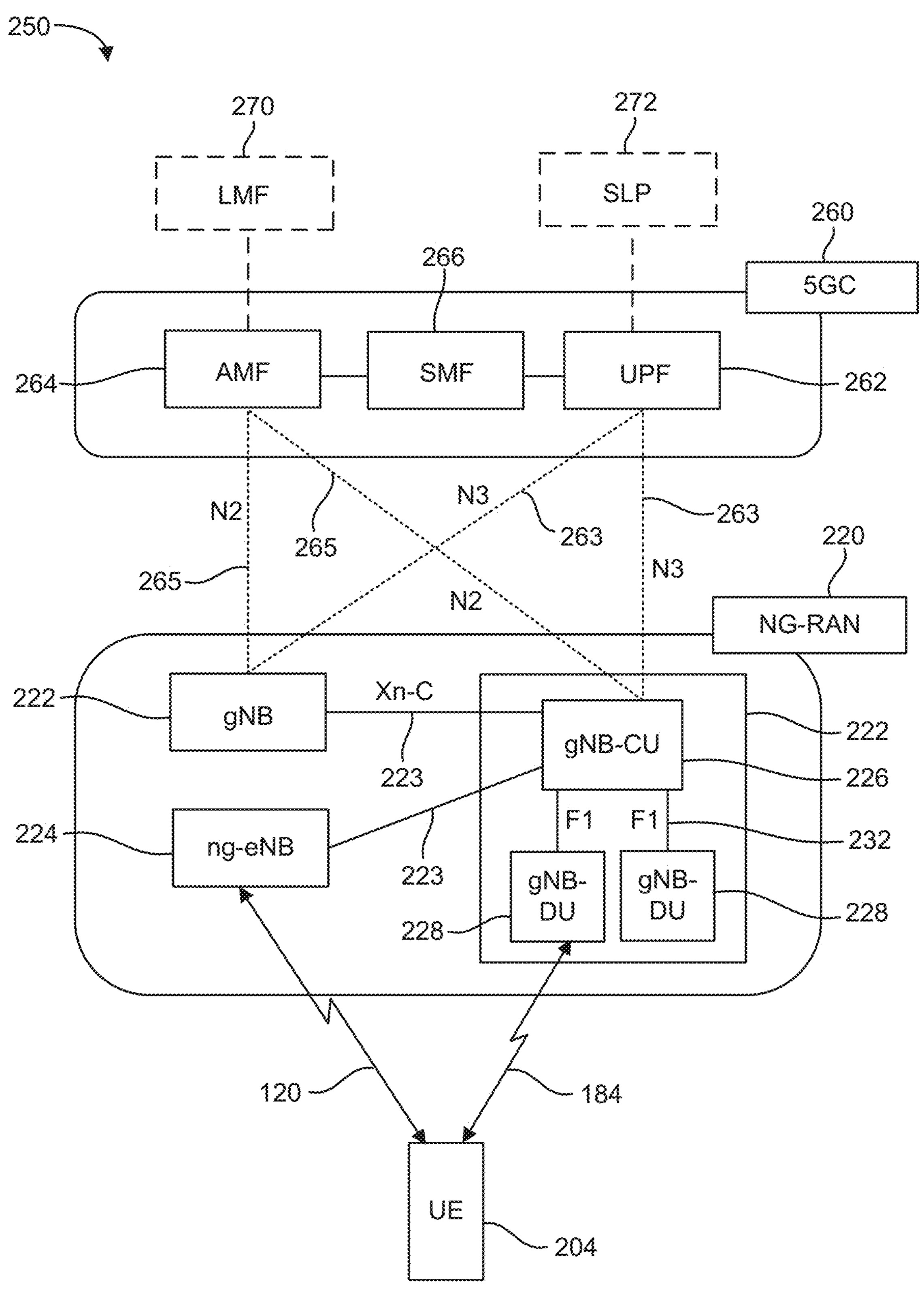

FIG. 2B illustrates another example wireless network structure 250. A 5GC 260 (which may correspond to 5GC 210 in FIG. 2A) can be viewed functionally as control plane functions, provided by an access and mobility management function (AMF) 264, and user plane functions, provided by a user plane function (UPF) 262, which operate cooperatively to form the core network (i.e., 5GC 260). The functions of the AMF 264 include registration management, connection management, reachability management, mobility management, lawful interception, transport for session management (SM) messages between one or more UEs 204 (e.g., any of the UEs described herein) and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the NG-RAN 220 and the LMF 270, evolved packet system (EPS) bearer identifier allocation for interworking with the EPS, and UE 204 mobility event notification. In addition, the AMF 264 also supports functionalities for non-3GPP (Third Generation Partnership Project) access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy Rile enforcement (e.g., gating, redirection, traffic steering), lawful interception (user plane collection), traffic usage reporting, quality of service (QoS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as an SLP 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an IMP 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, NG-RAN 220, and UEs 204 over a control plane (e.g., using interfaces and protocols intended to convey signaling messages and not voice or data), the SLP 272 may communicate with UEs 204 and external clients (not shown in FIG. 2B) over a user plane (e.g., using protocols intended to carry voice and/or data like the transmission control protocol (TCP) and/or IP).

User plane interface 263 and control plane interface 265 connect the 5GC 260, and specifically the UPF 262 and AMF 264, respectively, to one or more gNBs 222 and/or ng-eNBs 224 in the NG-RAN 220. The interface between gNB(s) 222 and/or ng-eNB(s) 224 and the AMF 264 is referred to as the "N2" interface, and the interface between gNB(s) 222 and/or ng-eNB(s) 224 and the IMF 262 is referred to as the "N3" interface. The gNB(s) 222 and/or ng-eNB(s) 224 of the NG-RAN 220 may communicate directly with each other via backhaul connections 223, referred to as the "Xn-C" interface. One or more of gNBs 222 and/or ng-eNBs 224 may communicate with one or more UEs 204 over a wireless interface, referred to as the "Uu" interface.

The functionality of a gNB 222 is divided between a gNB central unit (gNB-CU) 226 and one or more gNB distributed units (gNB-DUs) 228. The interface 232 between the gNB-CU 226 and the one or more gNB-DUs 228 is referred to as the "F1" interface. A gNB-CU 226 is a logical node that includes the base station functions of transferring user data, mobility control, radio access network sharing, positioning, session management, and the like, except for those functions allocated exclusively to the gNB-DU(s) 228. More specifically, the gNB-CU 226 hosts the radio resource control (RRC), service data adaptation protocol (SDAP), and packet data convergence protocol (PDCP) protocols of the gNB 222. A gNB-DU 228 is a logical node that hosts the radio link control (RLC), medium access control (MAC), and physical (PHY) layers of the gNB 222. Its operation is controlled by the gNB-CU 226. One gNB-DU 228 can support one or more cells, and one cell is supported by only one gNB-DU 228. Thus, a UE 204 communicates with the gNB-CU 226 via the RRC, SOAP, and PDCP layers and with a gNB-DU 228 via the RLC, MAC, and PHY layers.

Figure 3A:
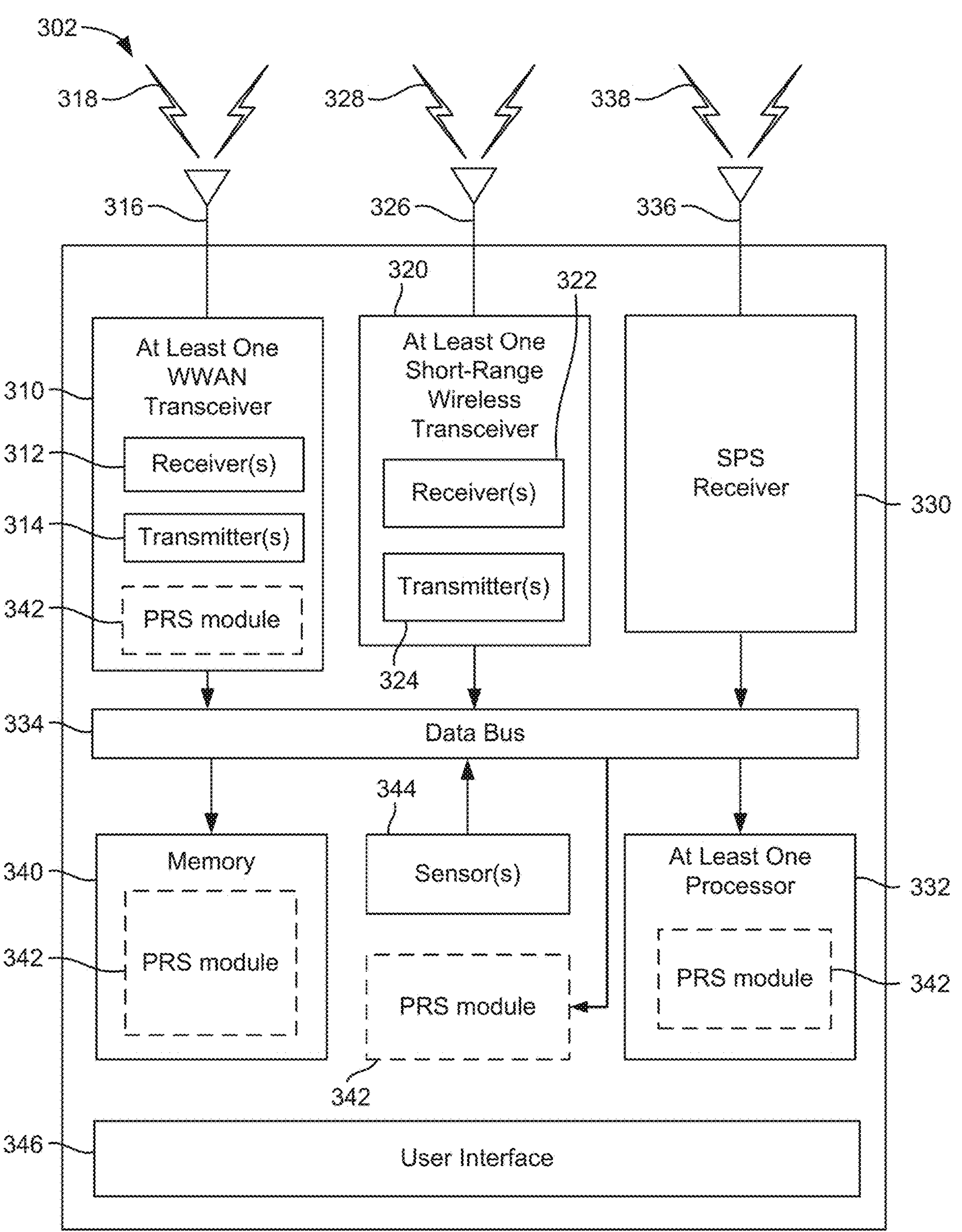
FIGS. 3A to 3C are simplified block diagrams of several sample aspects of components that may be employed in a user equipment (UE), a base station, and a network entity, respectively, and configured to support communications as taught herein.
Figure 3B:
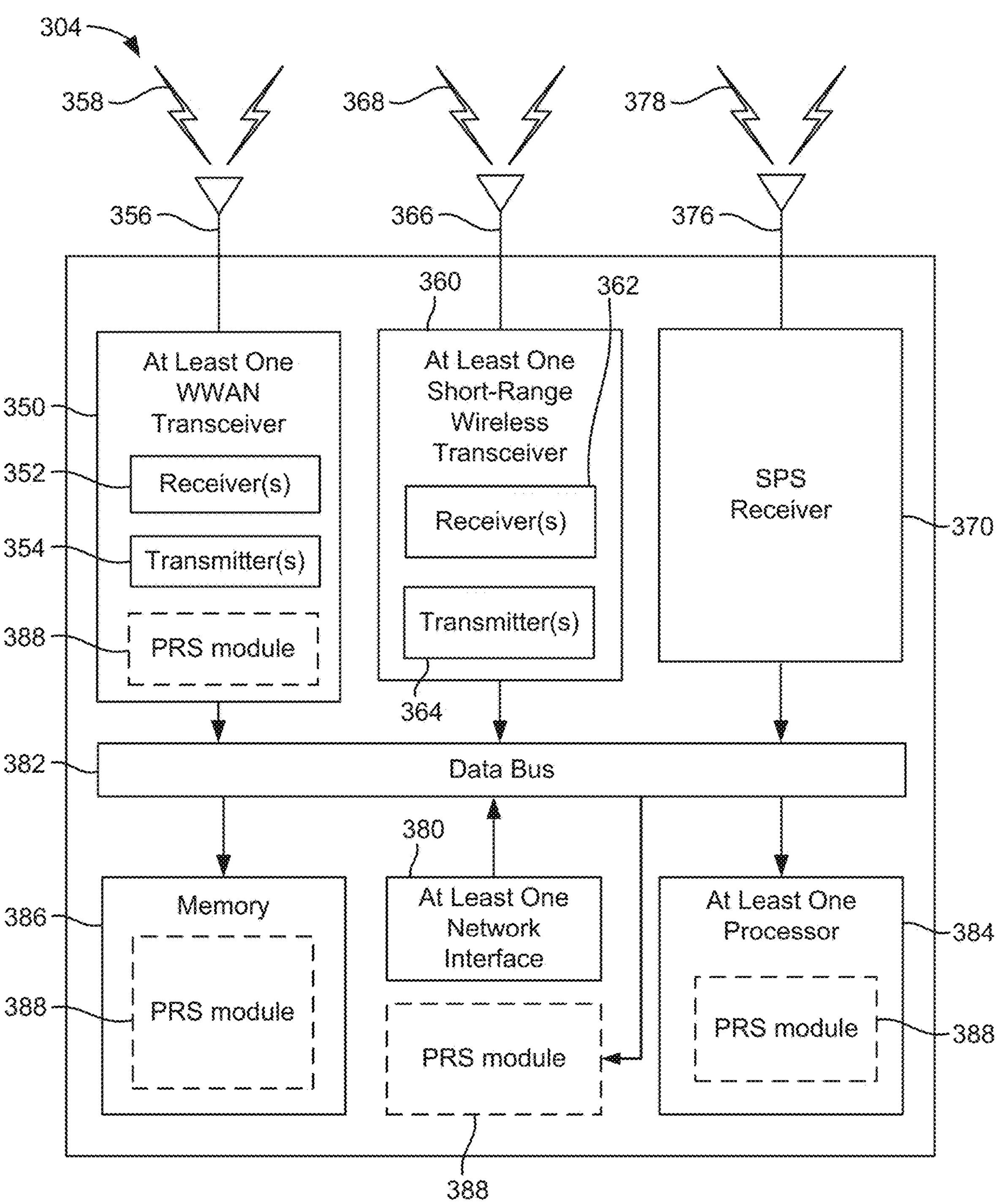
Figure 3C:
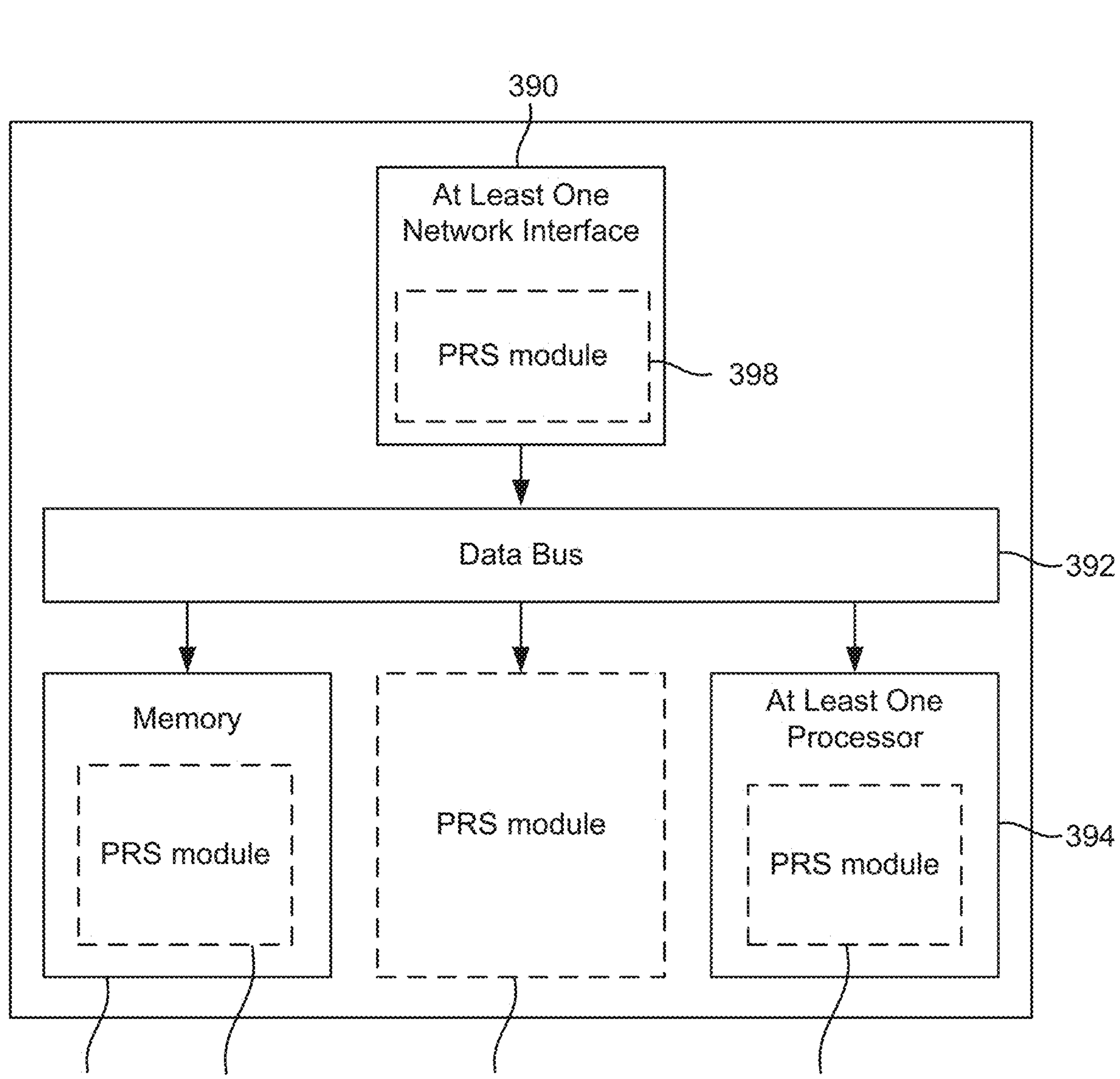

FIGS. 3A, 3B, and 3C illustrate several example components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270, or alternatively may be independent from the NG-RAN 220 and/or 5GC 210/260 infrastructure depicted in FIGS. 2A and 2B, such as a private network) to support the file transmission operations as taught herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include at least one wireless wide area network (WWAN) transceiver 310 and 350, respectively, providing means for communicating (e.g., means for transmitting, means for receiving, means for measuring, means for tuning, means for refraining from transmitting, etc.) via one or more wireless communication networks (not shown), such as an NR network, an UE network, a GSM network, and/or the like. The WWAN transceivers 310 and 350 may be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the WWAN transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 each also include, at least in some cases, at least one short-range wireless transceiver 320 and 360, respectively. The short-range wireless transceivers 320 and 360 may be connected to one or more antennas 326 and 366, respectively, and provide means for communicating (e.g., means for transmitting, means for receiving, means for measuring, means for tuning, means for refraining from transmitting, etc.) with other network nodes, such as other UEs, access points, base stations, etc., via at least one designated RAT (e.g., WiFi, LTE-D, Bluetooth®, Zigbee®, Z-Wave®, PC5, dedicated short-range communications (DSRC), wireless access for vehicular environments (WAVE), near-field communication (NFC), etc.) over a wireless communication medium of interest. The short-range wireless transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the short-range wireless transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively. As specific examples, the short-range wireless transceivers 320 and 360 may be WiFi transceivers, Bluetooth® transceivers, Zigbee® and/or Z-Wave® transceivers, NFC transceivers, or vehicle-to-vehicle (V2V) and/or vehicle-to-everything (V2X) transceivers.

Transceiver circuitry including at least one transmitter and at least one receiver may comprise an integrated device (e.g., embodied as a transmitter circuit and a receiver circuit of a single communication device) some implementations, may comprise a separate transmitter device and a separate receiver device in some implementations, or may be embodied in other ways in other implementations. In an aspect, a transmitter may include or be coupled to a plurality of antennas (e.g., antennas 316, 326, 356, 366), such as an antenna array, that permits the respective apparatus to perform transmit "beamforming," as described herein. Similarly, a receiver may include or be coupled to a plurality of antennas (e.g., antennas 316, 326, 356, 366), such as an antenna array, that permits the respective apparatus to perform receive beamforming, as described herein. In an aspect, the transmitter and receiver may share the same plurality of antennas (e.g., antennas 316, 326, 356, 366), such that the respective apparatus can only receive or transmit at a given time, not both at the same time. A wireless communication device (e.g., one or both of the transceivers 310 and 320 and/or 350 and 360) of the UE 302 and/or the base station 304 may also comprise a network listen module (NLM) or the like for performing various measurements.

The UE 302 and the base station 304 also include, at least in some cases, satellite positioning systems (SPS) receivers 330 and 370. The SPS receivers 330 and 370 may be connected to one or more antennas 336 and 376, respectively, and may provide means for receiving and/or measuring SPS signals 338 and 378, respectively, such as global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. The SPS receivers 330 and 370 may comprise any suitable hardware and/or software for receiving and processing SPS signals 338 and 378, respectively. The SPS receivers 330 and 370 request information and operations as appropriate from the other systems, and performs calculations necessary to determine positions of the UE 302 and the base station 304 using measurements obtained by any suitable SPS algorithm.

The base station 304 and the network entity 306 each include at least one network interface 380 and 390, respectively, providing means for communicating (e.g., means for transmitting, means for receiving, etc.) with other network entities. For example, the network interfaces 380 and 390 (e.g., one or more network access ports) may be configured to communicate with one or more network entities via a wire-based or wireless backhaul connection. In some aspects, the network interfaces 380 and 390 may be implemented as transceivers configured to support wire-based or wireless signal communication. This communication may involve, for example, sending and receiving messages, parameters, and/or other types of information.

In an aspect, the at least one WWAN transceiver 310 and/or the at least one short-range wireless transceiver 320 may form a (wireless) communication interface of the UE 302. Similarly, the at least one WWAN transceiver 350, the at least one short-range wireless transceiver 360, and/or the at least one network interface 380 may form a (wireless) communication interface of the base station 304. Likewise, the at least one network interface 390 may form a (wireless) communication interface of the network entity 306. The various wireless transceivers (e.g., transceivers 310, 320, 350, and 360) and wired transceivers (e.g., network interfaces 380 and 390) may generally be characterized as at least one transceiver, or alternatively, as at least one communication interface. As such, whether a particular transceiver or communication interface relates to a wired or wireless transceiver or communication interface, respectively, may be inferred from the type of communication performed (e.g., a backhaul communication between network devices or servers will generally relate to signaling via at least one wired transceiver).

The UE 302, the base station 304, and the network entity 306 also include other components that may be used in conjunction with the operations as disclosed herein. The UE 302, the base station 304, and the network entity 306 include at least one processor 332, 384, and 394, respectively, for providing functionality relating to, for example, wireless communication, and for providing other processing functionality. The processors 332, 384, and 394 may therefore provide means for processing, such as means for determining, means for calculating, means for receiving, means for transmitting, means for indicating, etc. In an aspect, the processors 332, 384, and 394 may include, for example, at least one general purpose processor, multi-core processor, central processing unit (CPU), ASIC, digital signal processor (DSP), field programmable gate array (FPGA), other programmable logic devices or processing circuitry, or various combinations thereof.

The UE 302, the base station 304, and the network entity 306 include memory circuitry implementing memory components 340, 386, and 396 (e.g., each including a memory device), respectively, for maintaining information information indicative of reserved resources, thresholds, parameters, and so on). The memory components 340, 386, and 396 may therefore provide means for storing, means for retrieving, means for maintaining, etc. In some cases, the UE 302, the base station 304, and the network entity 306 may include PRS modules 342, 388, and 398, respectively. The PRS modules 342, 388, and 398 may be hardware circuits that are part of or coupled to the processors 332, 384, and 394, respectively, that, when executed, cause the UE 302, the base station 304, and the network entity 306 to perform the functionality described herein. In other aspects, the PRS modules 342, 388, and 398 may be external to the processors 332, 384, and 394 (e.g., part of a modem processing system, integrated with another processing system, etc.). Alternatively, the PRS modules 342, 388, and 398 may be memory modules stored in the memory components 340, 386, and 396, respectively, that, when executed by the processors 332, 384, and 394 (or a modem processing system, another processing system, etc.), cause the UE 302, the base station 304, and the network entity 306 to perform the functionality described herein. FIG. 3A illustrates possible locations of the PRS module 342, which may be, for example, part of the at least one WWAN transceiver 310, the memory component 340, the at least one processor 332, or any combination thereof, or may be a standalone component. FIG. 3B illustrates possible locations of the PRS module 388, which may be, for example, part of the at least one WWAN transceiver 350, the memory component 386, the at least one processor 384, or any combination thereof, or may be a standalone component. FIG. 3C illustrates possible locations of the PRS module 398, which may be, for example, part of the at least one network interface 390, the memory component 396, the at least one processor 394, or any combination thereof, or may be a standalone component.

The UE 302 may include one or more sensors 344 coupled to the at least one processor 332 to provide means for sensing or detecting movement and/or orientation information that is independent of motion data derived from signals received by the at least one WWAN transceiver 310, the at least one short-range wireless transceiver 320, and/or the SPS receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in two-dimensional (2D) and/or three-dimensional (3D) coordinate systems.

In addition, the UE 302 includes a user interface 346 providing means for providing indications (e.g., audible and/or visual indications) to a user and/or for receiving user input (e.g., upon user actuation of a sensing device such a keypad, a touch screen, a microphone, and so on). Although not shown; the base station 304 and the network entity 306 may also include user interfaces.

Referring to the at least one processor 384 in more detail, in the downlink, IP packets from the network entity 306 may be provided to the at least one processor 384. The at least one processor 384 may implement functionality for an RRC layer, a packet data convergence protocol (PDCP) layer, a radio link control (RLC) layer, and a medium access control (MAC) layer. The at least one processor 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer PDUs, error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 (L1) functionality associated with various signal processing functions. Layer-1, which includes a physical (PEW) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift, keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the at least one processor 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the at least one processor 332, which implements Layer-3 (L3) and Layer-2 (L2) functionality.

In the uplink, the at least one processor 332 provides demultiplexing between transport and logical channels, packet reassembly, deciphering, header decompression, and control signal processing to recover IP packets from the core network. The at least one processor 332 is also responsible for error detection.

Similar to the functionality described in connection with the downlink transmission by the base station 304, the at least one processor 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARQ), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the at least one processor 384.

In the uplink, the at least one processor 384 provides demultiplexing between transport and logical channels, packet reassembly, deciphering, header decompression, control signal processing to recover IP packets from the UE 302. IP packets from the at least one processor 384 may be provided to the core network. The at least one processor 384 is also responsible for error detection.

For convenience, the UE 302, the base station 304, and/or the network entity 306 are shown in FIGS. 3A to 3C as including various components that may be configured according to the various examples described herein. It will be appreciated, however, that the illustrated components may have different functionality in different designs.

The various components of the UE 302, the base station 304, and the network entity 306 may communicate with each other over data buses 334, 382, and 392, respectively. In an aspect, the data buses 334, 382, and 392 may form, or be part of, the communication interface of the UE 302, the base station 304, and the network entity 306, respectively. For example, where different logical entities are embodied in the same device (e.g., gNB and location server functionality incorporated into the same base station 304), the data buses 334, 382, and 392 may provide communication between them.

The components of FIGS. 3A to 3C may be implemented in various ways. In some implementations, the components of FIGS. 3A to 3C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a network entity," etc. However, as will be appreciated, such operations, acts, and/or functions may actually be performed by specific components or combinations of components of the UE 302, base station 304, network entity 306, etc., such as the processors 332, 384, 394, the transceivers 310, 320, 350, and 360, the memory components 340, 386, and 396, the PRS modules 342, 388, and 398, etc.

In some designs, the network entity 306 may be implemented as a core network component. In other designs, the network entity 306 may be distinct from a network operator or operation of the cellular network infrastructure (e.g., NO RAN 220 and/or 5GC 210/260). For example, the network entity 306 may be a component of a private network that may be configured to communicate with the UE 302 via the base station 304 or independently from the base station 304 (e.g., over a non-cellular communication link, such as WiFi).

Figure 4:
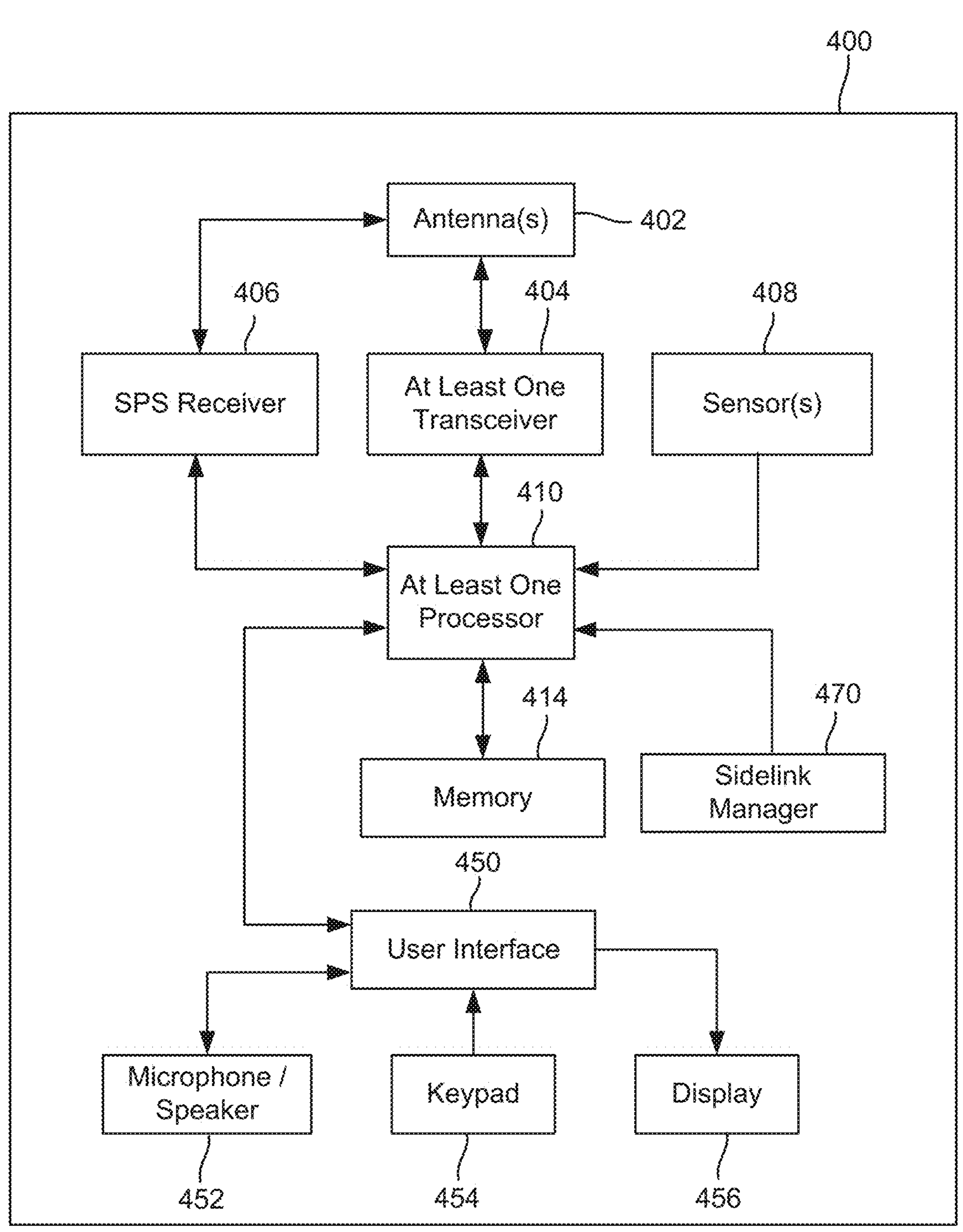
FIG. 4 is a block diagram illustrating various components of an example user equipment (UE), according to aspects of the disclosure.

FIG. 4 is a block diagram illustrating various components of an example UE 400, according to aspects of the disclosure. In an aspect, the UE 400 may correspond to any of the UEs described herein. As a specific example, the UE 400 may be a V-UE, such as V-UE 160 in FIG. 1. For the sake of simplicity, the various features and functions illustrated in the block diagram of FIG. 4 are connected together using a common data bus that is meant to represent that these various features and functions are operatively coupled together. Those skilled in the art will recognize that other connections, mechanisms, features, functions, or the like, may be provided and adapted as necessary to operatively couple and configure an actual UE. Further, it is also recognized that one or more of the features or functions illustrated in the example of FIG. 4 may be further subdivided, or two or more of the features or functions illustrated in FIG. 4 may be combined.

The UE 400 may include at least one transceiver 404 connected to one or more antennas 402 and providing means for communicating (e.g., means for transmitting, means for receiving, means for measuring, means for tuning, means for refraining from transmitting, etc.) with other network nodes, such as V-UEs (e.g., V-UEs 160), infrastructure access points (e.g., roadside access point 164), P-UEs (e.g., UEs 104), base stations (e.g., base stations 102), etc., via at least one designated RAT (e.g., cV2X or IEEE 802.11p) over one or more communication links (e.g., communication links 120, sidelinks 162, 166, 168, mmW communication link 184). The at least one transceiver 404 may be variously configured for transmitting and encoding signals (e.g., messages, indications, information, and soon), and, conversely, for receiving and decoding signals (e.g., messages, indications, information, pilots, and so on) in accordance with the designated RAT. In an aspect, the at least one transceiver 404 and the antennas) 402 may form a (wireless) communication interface of the UE 400.

As used herein, a "transceiver" may include at least one transmitter and at least one receiver in an integrated device embodied as a transmitter circuit and a receiver circuit of a single communication device) in some implementations, may comprise a separate transmitter device and a separate receiver device in some implementations, or may be embodied in other ways in other implementations. In an aspect, a transmitter may include or be coupled to a plurality of antennas (e.g., antenna(s) 402), such as an antenna array, that permits the UE 400 to perform transmit "beamforming," as described herein. Similarly, a receiver may include or be coupled to a plurality of antennas (e.g., antennas) 402), such as an antenna array, that permits the UE 400 to perform receive beamforming, as described herein. In an aspect, the transmitter(s) and receiver(s) may share the same plurality of antennas (e.g., antenna(s) 402), such that the UE 400 can only receive or transmit at a given time, not both at the same time. In some cases, a transceiver may not provide both transmit and receive functionalities. For example, a low functionality receiver circuit may be employed in some designs to reduce costs when providing full communication is not necessary (e.g., a receiver chip or similar circuitry simply providing low-level sniffing).

The UE 400 may also include a satellite positioning service (SPS) receiver 406. The SPS receiver 406 may be connected to the one or more antennas 402 and may provide means for receiving and/or measuring satellite signals. The SPS receiver 406 may comprise any suitable hardware and/or software for receiving and processing SPS signals, such as global positioning system (GPS) signals. The SPS receiver 406 requests information and operations as appropriate from the other systems, and performs the calculations necessary to determine the UE's 400 position using measurements obtained by any suitable SPS algorithm.

One or more sensors 408 may be coupled to at least one processor 410 and may provide means for sensing or detecting information related to the state and/or environment of the UE 400, such as speed, heading (e.g., compass heading), headlight status, gas mileage, etc. By way of example, the one or more sensors 408 may include a speedometer, a tachometer, an accelerometer (e.g., a microelectromechanical systems (MEMS) device), a gyroscope, a geomagnetic sensor e.g., a compass), an altimeter (e.g., a barometric pressure altimeter), etc.

The at least one processor 410 may include one or more central processing units (CPUs), microprocessors, microcontrollers, ASICs, processing cores, digital signal processors (DSPs), field-programmable gate arrays (FPGAs), or the like that provide processing functions, as well as other calculation and control functionality. The at least one processor 410 may therefore provide means for processing, such as means for determining, means for calculating, means for receiving, means for transmitting, means for indicating, etc. The at least one processor 410 may include any form of logic suitable for performing, or causing the components of the UE 400 to perform, at least the techniques described herein.

The at least one processor 410 may also be coupled to a memory 414 providing means for storing (including means for retrieving, means for maintaining, etc.) data and software instructions for executing programmed functionality within the UE 400. The memory 414 may be on-board the at least one processor 410 (e.g., within the same integrated circuit (IC) package), and/or the memory 414 may be external to the at least one processor 410 and functionally coupled over a data bus.

The UE 400 may include a user interface 450 that provides any suitable interface systems, such as a microphone/speaker 452, keypad 454, and display 456 that allow user interaction with the UE 400. The microphone/speaker 452 may provide for voice communication services with the UE 400. The keypad 454 may comprise any suitable buttons for user input to the UE 400. The display 456 may comprise any suitable display, such as, for example, a backlit liquid crystal display (LCD), and may further include a touch screen display for additional user input modes. The user interface 450 may therefore be a means for providing indications (e.g., audible and/or visual indications) to a user and/or for receiving user input (e.g., via user actuation of a sensing device such a keypad, a touch screen, a microphone, and so on).

In an aspect, the UE 400 may include a sidelink manager 470 coupled to the at least one processor 410. The sidelink manager 470 may be a hardware, software, or firmware component that, when executed, causes the UE 400 to perform the operations described herein. For example, the sidelink manager 470 may be a software module stored in memory 414 and executable by the at least one processor 410. As another example, the sidelink manager 470 may be a hardware circuit (e.g., an ASIC, a field-programmable gate array (FPGA), etc.) within the UE 400.

Figure 5:
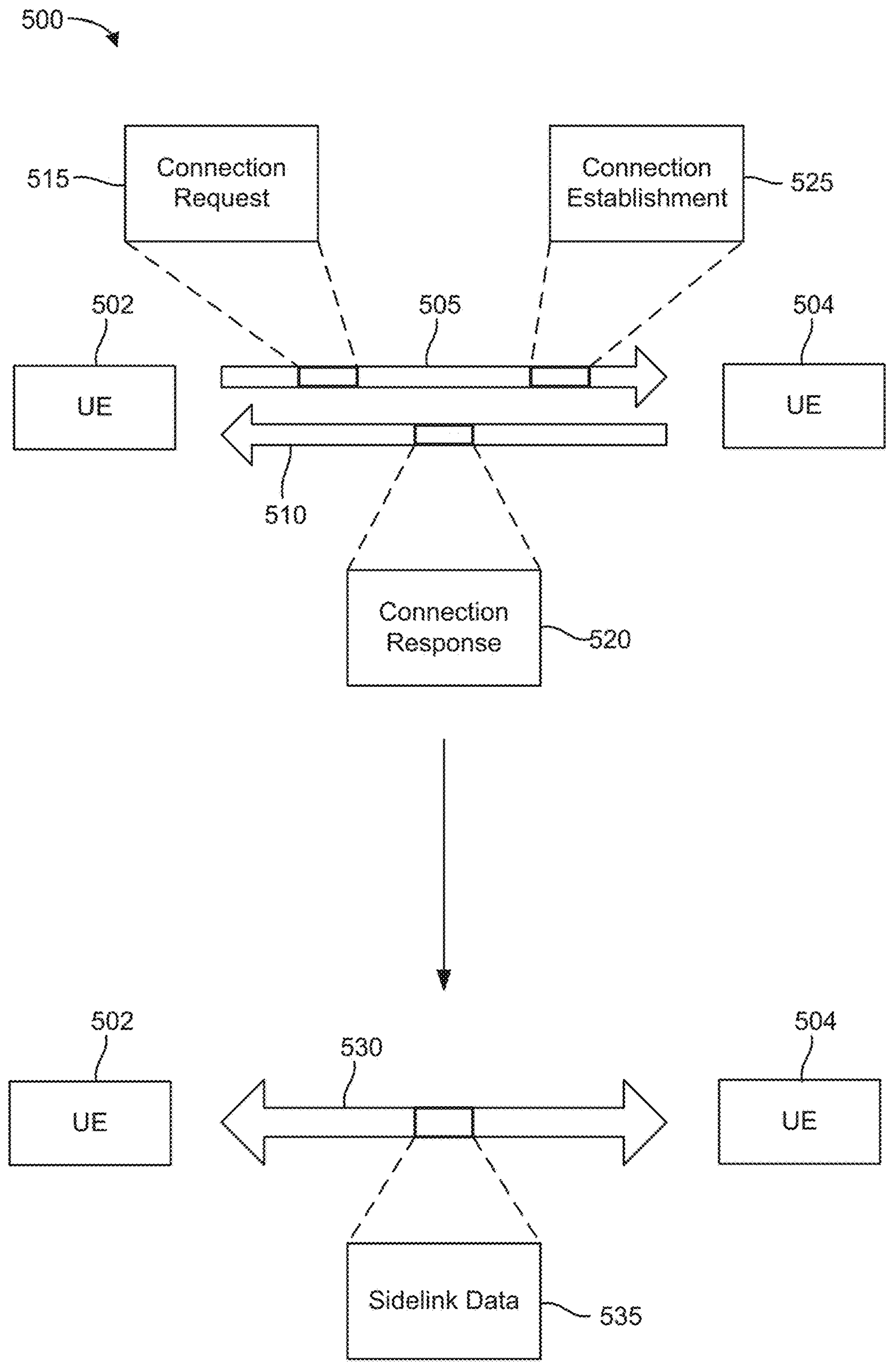
FIG. 5 illustrates an example of a wireless communications system that supports unicast sidelink establishment, according to aspects of the disclosure.

FIG. 5 illustrates an example of a wireless communications system 500 that supports wireless unicast sidelink establishment, according to aspects of the disclosure. In some examples, wireless communications system 500 may implement aspects of wireless communications systems 100, 200, and 250. Wireless communications system 500 may include a first UE 502 and a second UE 504, which may be examples of any of the UEs described herein. As specific examples, UEs 502 and 504 may correspond to V-UEs 160 in FIG. 1, UE 190 and UE 104 in FIG. 1 connected over D2D P2P link 192, or UEs 204 in FIGS. 2A and 2B.

In the example of FIG. 5, the UE 502 may attempt to establish a unicast connection over a sidelink with the UE 504, which may be a V2X sidelink between the UE 502 and UE 504. As specific examples, the established sidelink connection may correspond to sidelinks 162 and/or 168 in FIG. 1. The sidelink connection may be established in an omni-directional frequency range (e.g., FR1) and/or a mmW frequency range (e.g., FR2). In some cases, the UE 502 may be referred to as an initiating UE that initiates the sidelink connection procedure, and the UE 504 may be referred to as a target UE that is targeted for the sidelink connection procedure by the initiating UE.

For establishing the unicast connection, access stratum (AS) (a functional layer in the UMTS and LTE protocol stacks between the RAN and the UE that is responsible for transporting data over wireless links and managing radio resources, and which is part of Layer 2) parameters may be configured and negotiated between the UE 502 and UE 504. For example, a transmission and reception capability matching may be negotiated between the UE 502 and UE 504. Each UE may have different capabilities (e.g., transmission and reception, 64 quadrature amplitude modulation (QAM), transmission diversity, carrier aggregation (CA), supported communications frequency band(s), etc.). In some cases, different services may be supported at the upper layers of corresponding protocol stacks for UE 502 and UE 504. Additionally, a security association may be established between UE 502 and UE 504 for the unicast connection. Unicast traffic may benefit from security protection at a link level (e.g., integrity protection). Security requirements may differ for different wireless communications systems. For example, V2X and Uu systems may have different security requirements (e.g., Uu security does not include confidentiality protection). Additionally, IP configurations (e.g., IP versions, addresses, etc.) may be negotiated for the unicast connection between UE 502 and UE 504.

In some cases, UE 504 may create a service announcement (e.g., a service capability message) to transmit over a cellular network (e.g., cV2X) to assist the sidelink connection establishment, Conventionally, UE 502 may identify and locate candidates for sidelink communications based on a basic service message (BSM) broadcasted unencrypted by nearby UEs (e.g., UE 504). The BSM may include location information, security and identity information, and vehicle information (e.g., speed, maneuver, size, etc.) for the corresponding UE. However, for different wireless communications systems (e.g., D2D or V2X communications), a discovery channel may not be configured so that UE 502 is able to detect the BSM(s). Accordingly, the service announcement transmitted by UE 504 and other nearby UEs (e.g., a discovery signal) may be an upper layer signal and broadcasted (e.g., in an NR sidelink broadcast). In some cases, the UE 504 may include one or more parameters for itself in the service announcement, including connection parameters and/or capabilities it possesses. The UE 502 may then monitor for and receive the broadcasted service announcement to identify potential UEs for corresponding sidelink connections. In some cases, the UE 502 may identify the potential UEs based on the capabilities each UE indicates in their respective service announcements.

The service announcement may include information to assist the UE 502 (e.g., or any initiating UE) to identify the UE transmitting the service announcement (UE 504 in the example of FIG. 5). For example, the service announcement may include channel information where direct communication requests may be sent. In some cases, the channel information may be RAT-specific (e.g., specific to LTE or NR) and may include a resource pool within which UE 502 transmits the communication request. Additionally, the service announcement may include a specific destination address for the UE (e.g., a Layer 2 destination address) if the destination address is different from the current address (e.g., the address of the streaming provider or UE transmitting the service announcement), The service announcement may also include a network or transport layer for the UE 502 to transmit a communication request on. For example, the network layer (also referred to as "Layer 3" or "L3") or the transport layer (also referred to as "Layer 4" or "L4") may indicate a port number of an application for the UE transmitting the service announcement. In some cases, no IP addressing may be needed if the signaling (e.g., PC5 signaling) carries a protocol (e.g., a real-time transport protocol (RIP)) directly or gives a locally-generated random protocol. Additionally, the service announcement may include a type of protocol for credential establishment and QoS-related parameters.

After identifying a potential sidelink connection target (UE 504 in the example of FIG. 5), the initiating UE (UE 502 in the example of FIG. 5) may transmit a connection request 515 to the identified target UE 504. In some cases, the connection request 515 may be a first RRC message transmitted by the UE 502 to request a unicast connection with the UE 504 (e.g., an "RRCDirectConnectionSetupRequest" message). For example, the unicast connection may utilize the PC5 interface for the sidelink, and the connection request 515 may be an RRC connection setup request message. Additionally, the UE 502 may use a sidelink signaling radio bearer 505 to transport the connection request 515.

After receiving the connection request 515, the UE 504 may determine whether to accept or reject the connection request 515. The UE 504 may base this determination on a transmission/reception capability, an ability to accommodate the unicast connection over the sidelink, a particular service indicated for the unicast connection, the contents to be transmitted over the unicast connection, or a combination thereof. For example, if the UE 502 wants to use a first RAT to transmit or receive data, but the UE 504 does not support the first RAT, then the UE 504 may reject the connection request 515. Additionally or alternatively, the UE 504 may reject the connection request 515 based on being unable to accommodate the unicast connection over the sidelink due to limited radio resources, a scheduling issue, etc. Accordingly, the UE 504 may transmit an indication of whether the request is accepted or rejected in a connection response 520. Similar to the UE 502 and the connection request 515, the UE 504 may use a sidelink signaling radio bearer 510 to transport the connection response 520. Additionally, the connection response 520 may be a second RRC message transmitted by the UE 504 in response to the connection request 515 an "RRCDirectConnectionResponse" message).

In some cases, sidelink signaling radio bearers 505 and 510 may be the same sidelink signaling radio bearer or may be separate sidelink signaling radio bearers. Accordingly, a radio link control (RLC) layer acknowledged mode (AM) may be used for sidelink signaling radio bearers 505 and 510. A UE that supports the unicast connection may listen on a logical channel associated with the sidelink signaling radio bearers. In some cases, the AS layer (i.e., Layer 2) may pass information directly through RRC signaling (e.g., control plane) instead of a V2X layer (e.g., data plane).

If the connection response 520 indicates that the UE 504 accepted the connection request 515, the UE 502 may then transmit a connection establishment 525 message on the sidelink signaling radio bearer 505 to indicate that the unicast connection setup is complete. In some cases, the connection establishment 525 may be a third RRC message (e.g., an "RRCDirectConnectionSetupComplete" message). Each of the connection request 515, the connection response 520, and the connection establishment 525 may use a basic capability when being transported from one UE to the other UE to enable each UE to be able to receive and decode the corresponding transmission (e.g., the RRC messages).

Additionally, identifiers may be used for each of the connection request 515, the connection response 520, and the connection establishment 525, For example, the identifiers may indicate which UE 502/504 is transmitting which message and/or for which UE 502/504 the message is intended. For physical (PHY) layer channels, the RRC signaling and any subsequent data transmissions may use the same identifier (e.g., Layer 2 IDs). However, for logical channels, the identifiers may be separate for the RRC signaling and for the data transmissions. For example, on the logical channels, the RRC signaling and the data transmissions may be treated differently and have different acknowledgement (ACK) feedback messaging. In some cases, for the RRC messaging, a physical layer ACK may be used for ensuring the corresponding messages are transmitted and received properly.

One or more information elements may be included in the connection request 515 and/or the connection response 520 for UE 502 and/or UE 504, respectively, to enable negotiation of corresponding AS layer parameters for the unicast connection. For example, the UE 502 and/or UE 504 may include packet data convergence protocol (PDCP) parameters in a corresponding unicast connection setup message to set a PDCP context for the unicast connection. In some cases, the PDCP context may indicate whether or not PDCP duplication is utilized for the unicast connection. Additionally, the UE 502 and/or UE 504 may include RLC parameters when establishing the unicast connection to set an RLC context for the unicast connection. For example, the RLC context may indicate whether an AM (e.g., a reordering timer (t-reordering) is used) or an unacknowledged mode (UM) is used for the RLC layer of the unicast communications.

Additionally, the UE 502 and/or UE 504 may include medium access control (MAC) parameters to set a MAC context for the unicast connection. In some cases, the MAC context may enable resource selection algorithms, a hybrid automatic repeat request (HARQ) feedback scheme (e.g., ACK or negative ACK (NACK) feedback), parameters for the HARQ feedback scheme, carrier aggregation, or a combination thereof for the unicast connection. Additionally, the UE 502 and/or UE 504 may include PRY layer parameters when establishing the unicast connection to set a PRY layer context for the unicast connection. For example, the PRY layer context may indicate a transmission format (unless transmission profiles are included for each UE 502/504) and a radio resource configuration (e.g., bandwidth part (BWP), numerology, etc.) for the unicast connection. These information elements may be supported for different frequency range configurations (e.g., FR1 and FR2).

In some cases, a security context may also be set for the unicast connection (e.g., after the connection establishment 525 message is transmitted). Before a security association (e.g., security context) is established between the UE 502 and UE 504, the sidelink signaling radio bearers 505 and 510 may not be protected. After a security association is established, the sidelink signaling radio bearers 505 and 510 may be protected. Accordingly, the security context may enable secure data transmissions over the unicast connection and the sidelink signaling radio bearers 505 and 510. Additionally, IP layer parameters (e.g., link-local IPv4 or IPv6 addresses) may also be negotiated. In some cases, the IP layer parameters may be negotiated by an upper layer control protocol running after RRC signaling is established (e.g., the unicast connection is established). As noted above, the UE 504 may base its decision on whether to accept or reject the connection request 515 on a particular service indicated for the unicast connection and/or the contents to be transmitted over the unicast connection (e.g., upper layer information). The particular service and/or contents may be also indicated by an upper layer control protocol running after RRC signaling is established.

After the unicast connection is established, the UE 502 and UE 504 may communicate using the unicast connection over a sidelink 530, where sidelink data 535 is transmitted between the two UEs 502 and 504. The sidelink 530 may correspond to sidelinks 162 and/or 168 in FIG. 1. In some cases, the sidelink data 535 may include RRC messages transmitted between the two UEs 502 and 504. To maintain this unicast connection on sidelink 530, UE 502 and/or UE 504 may transmit a keep alive message (e.g., "RRCDirectLinkAlive" message, a fourth RRC message, etc.). In some cases, the keep alive message may be triggered periodically or on-demand (e.g., event-triggered). Accordingly, the triggering and transmission of the keep alive message may be invoked by UE 502 or by both UE 502 and UE 504. Additionally or alternatively, a MAC control element (CE) (e.g., defined over sidelink 530) may be used to monitor the status of the unicast connection on sidelink 530 and maintain the connection. When the unicast connection is no longer needed (e.g., UE 502 travels far enough away from UE 504), either UE 502 and/or UE 504 may start a release procedure to drop the unicast connection over sidelink 530. Accordingly, subsequent RRC messages may not be transmitted between UE 502 and UE 504 on the unicast connection.

In NR, there may not be precise timing synchronization across the network. Instead, it may be sufficient to have coarse time-synchronization across base stations (e.g., within a cyclic prefix (CP) duration of the orthogonal frequency division multiplexing (OFDM) symbols). RTT-based methods generally only need coarse timing synchronization, and as such, are a preferred positioning method in NR.

Figure 6:
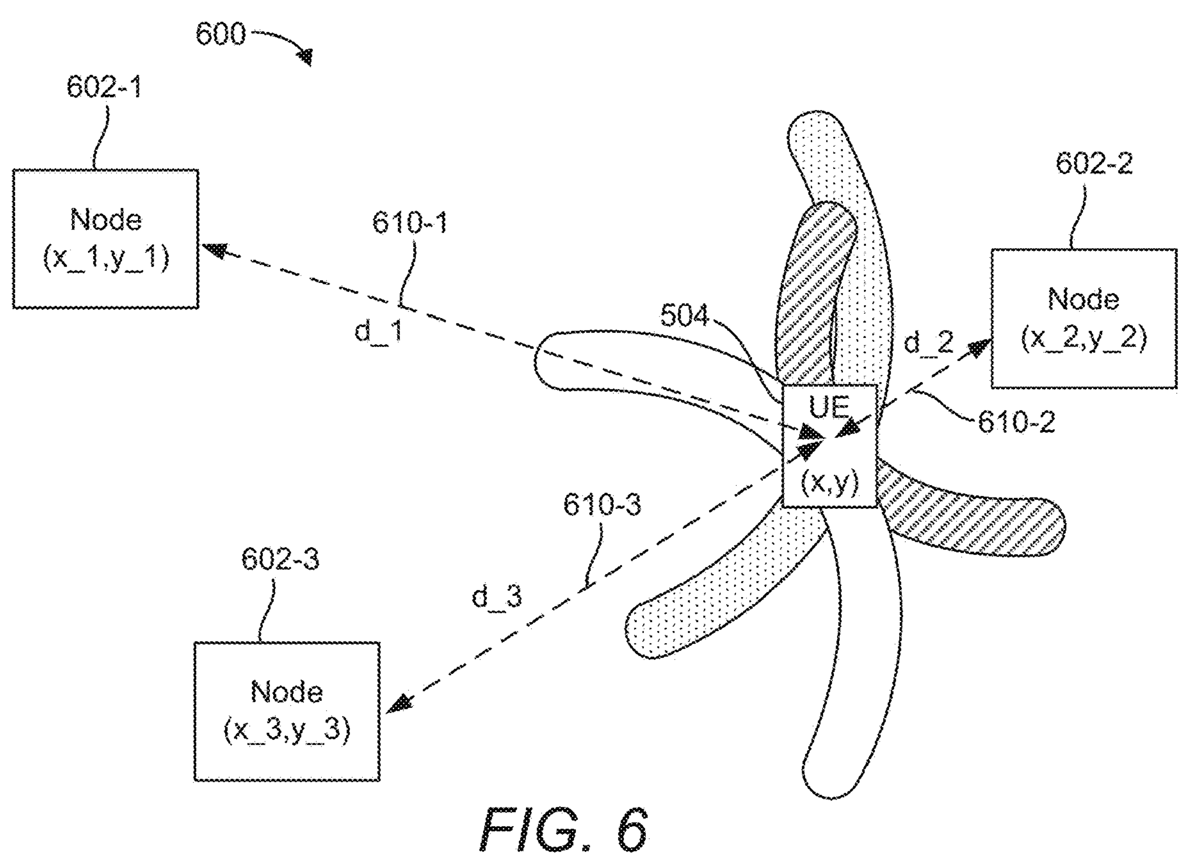
FIG. 6 is a diagram illustrating an example round-trip-time (RTT) procedure for determining a location of a UE, according to aspects of the disclosure.

FIG. 6 illustrates an example wireless communications system 600, according to aspects of the disclosure. In the example of FIG. 6, a UE 604 (e.g., any of the UEs described herein) is attempting to calculate an estimate of its location, or assist another entity (e.g., a base station or core network component, another UE, a location server, a third party application, etc.) to calculate an estimate of its location. The UE 604 may transmit and receive wireless signals to and from a plurality of network nodes (labeled "Node") 602-1, 602-2, and 602-3 (collectively, network nodes 602). The network nodes 602 may include one or more base stations (e.g., any of the base stations described herein), one or more reconfigurable intelligent displays (RIS), one or more positioning beacons, one or more UEs (e.g., connected over sidelinks), etc.

In a network-centric RTT positioning procedure the serving base station (e.g., one of network nodes 602) instructs the UE 604 to measure RTT measurement signals (e.g., PRS) from two or more neighboring network nodes 602 (and typically the serving base station, as at least three network nodes 602 are needed for a two-dimensional location estimate). The involved network nodes 602 transmit RTT measurement signals on low reuse resources (e.g., resources used by the network nodes 602 to transmit system information, where the network nodes 602 are base stations) allocated by the network (e.g., location server 230, LMF 270, SLP 272). The UE 604 records the arrival time (also referred to as the receive time, reception time, time of reception, or time of arrival) of each RTT measurement signal relative to the UE's 604 current downlink timing (e.g., as derived by the UE 604 from a downlink signal received from its serving base station), and transmits a common or individual RTT response signal (e.g., SRS) to the involved network nodes 602 on resources allocated by its serving base station. The UE 604, if it not the positioning entity, reports a UE reception-to-transmission (Rx-Tx) time difference measurement to the positioning entity. The UE Rx-Tx time difference measurement indicates the time difference between the arrival nine of each RTT measurement signal at the UE 604 and the transmission time(s) of the RTT response signal(s). Each involved network node 602 also reports, to the positioning entity, a transmission-to-reception (Tx-Rx) time difference measurement, which indicates the difference between the transmission time of the RTT measurement signal and the reception time of the RTT response signal.

A UE-centric RTT positioning procedure is similar to the network-based procedure, except that the UE 604 transmits uplink RTT measurement signal(s) (e.g., on resources allocated by the serving base station). The uplink RTT measurement signal(s) are measured by multiple network nodes 602 in the neighborhood of the UE 604. Each involved network node 602 responds with a downlink RTT response signal and reports an Rx-Tx time difference measurement to the positioning entity. The Rx-Tx time difference measurement indicates the time difference between the arrival time of the RTT measurement signal at the network node 602 and the transmission time of the RTT response signal. The UE 604, if it is not the positioning entity, reports, for each network node 602, a Tx-Rx time difference measurement that indicates the difference between the transmission time of the RTT measurement signal and the reception time of the RTT response signal.

In order to determine the location (x, y) of the UE 604, the positioning entity needs to know the locations of the network nodes 602, which may be represented in a reference coordinate system as (x_k, y_v), where k=1, 2, 3 in the example of FIG. 6. Where the UE 604 is the positioning entity, a location server with knowledge of the network geometry (e.g., location server 230, LMF 270, SLP 272) may provide the locations of the involved network nodes 602 to the UE 604.

The positioning entity determines each distance 610 (d_k, where k=1, 2, 3) between the UE 604 and the respective network node 602 based on the Rx-Tx and Tx-Rx time difference measurements and the speed of light, as described further below with reference to FIG. 7. Specifically, in the example of FIG. 6, the distance 610-1 between the UE 604 and the network node 602-1 is d_1, the distance 610-2 between the UE 604 and the network node 602-2 is d_2, and the distance 610-3 between the UE 604 and the network node 602-3 is d_3. Once each distance 610 is determined, the positioning entity can solve for the location (x, y) of the UE 604 by using a variety of known geometric techniques, such as trilateration or multilateration. From FIG. 6, it can be seen that the location of the UE 604 ideally lies at the common intersection of three semicircles, each semicircle being defined by radius dk and center (x_k, y_k), where k=1, 2, 3.

Figure 7:
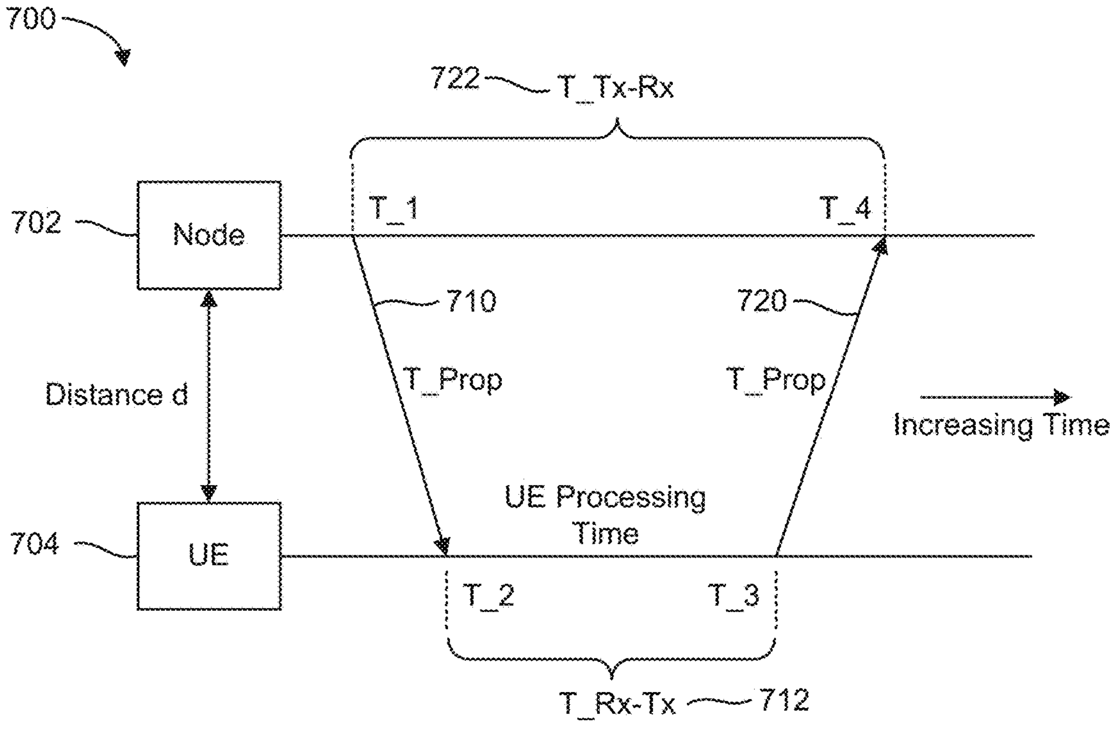
FIG. 7 is a diagram showing example timings of WIT measurement signals exchanged between a base station and a UE, according to aspects of the disclosure.

FIG. 7 is a diagram 700 showing example timings of WIT measurement signals exchanged between a network node 702 (labeled "Node") and a UE 704, according to aspects of the disclosure. The UE 704 may be any of the UEs described herein. The network node 702 may be a base station (e.g., any of the base stations described herein), an RIS, a positioning beacon, another UE (e.g., connected over a sidelink), or the like.

In the example of FIG. 7, the network node 702 (labeled "BS") sends an RTT measurement signal 710 (e.g., PRS) to the UE 704 at time T_1. The RTT measurement signal 710 has some propagation delay T_Prop as it travels from the network node 702 to the UE 704. At time T_2 (the reception time of the RTT measurement signal 710 at the UE 704), the UE 704 measures the RTT measurement signal 710. After some UE processing time, the UE 704 transmits an RTT response signal 720 (e.g., SRS) at time T_3. After the propagation delay TProp, the network node 702 measures the RTT response signal 720 from the UE 704 at time T_4 (the reception time of the RTT response signal 720 at the network node 702).

The UE 704 reports the difference between time T_3 and time T_2 (i.e., the UE's 704 Rx-Tx time difference measurement, shown as T_Rx-Tx 712) to the positioning entity. Similarly, the network node 702 reports the difference between time T_4 and time T_1 (i.e., the network node's 702 Tx-Rx time difference measurement, shown as T_Tx-Rx 722) to the positioning entity. Using these measurements and the known speed of light, the positioning entity can calculate the distance to the UE 704 as d=½*c*(T_Tx-Rx−T_Rx-Tx)=½*c*(T_4−T_1)−½*c*(T_3−T_2), where c is the speed of light.

Based on the known location of the network node 702 and the distance between the UE 704 and the network node 702 (and at least two other network nodes 702), the positioning entity can calculate the location of the UE 704. As shown in FIG. 6, the location of the UE 704 lies at the common intersection of three semicircles, each semicircle being defined by a radius of the distance between the UE 704 and a respective network node 702.

In an aspect, the positioning entity may calculate the UE's 604/704 location using a two-dimensional coordinate system; however, the aspects disclosed herein are not so limited, and may also be applicable to determining locations using a three-dimensional coordinate system, if the extra dimension is desired. Additionally, while FIG. 6 illustrates one UE 604 and three network nodes 602 and FIG. 7 illustrates one UE 704 and one network node 702, as will be appreciated, there may be more UEs 604/704 and more network nodes 602/702.

Figure 8:
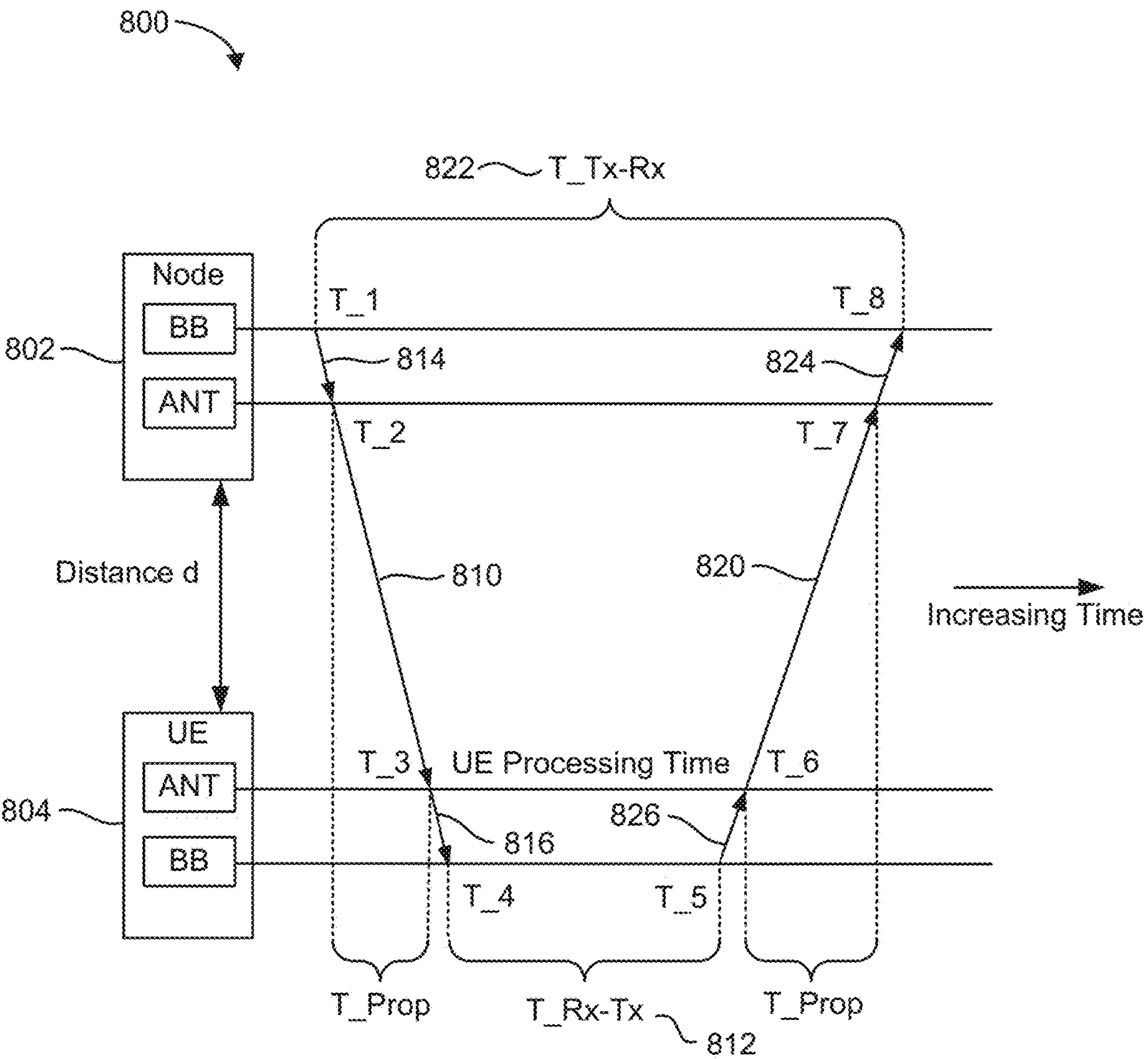
FIG. 8 is a diagram illustrating example timings of RTT measurement signals exchanged between a base station and a UE, according to aspects of the disclosure.

FIG. 8 is a diagram 800 showing example timings of RTT measurement signals exchanged between a network node 802 and a UE 804, according to aspects of the disclosure. The diagram 800 is similar to the diagram 700, except that it includes processing delays that may occur at both the network node 802 (labeled "Node") and the UE 804 when transmitting and receiving the RTT measurement and response signals. The network node 802 may be a base station (e.g., any of the base stations), an RIS (e.g., RIS 410), another UE (e.g., any of the UEs described herein), or other network node capable of performing an RTT positioning procedure. As a specific example, the network node 802 and the UE 804 may correspond to the base station 702 and the UE 704 in FIG. 7.

Referring now to potential processing delays, at the network node 802, there is a transmission delay 814 between the time T_1 that the network node's 802 baseband (labeled "BB") generates the RTT measurement signal 810 (e.g., a PRS) and the time T_2 that the network node's 802 antenna(s) (labeled "Ant") transmit the RTT measurement signal 810. At the UE 804, there is a reception delay 816 between the time T_3 that the UE's 604 antennas) (labeled "Ant") receive the RTT measurement signal 810 and the time T_4 that the UE's 804 baseband (labeled "BB") processes the RTT measurement signal 810.

Similarly, for the RTT response signal 820 (e.g., an SRS), there is a transmission delay 826 between the time T_5 that the UE's 804 baseband generates the WIT response signal 820 and the time T_6 that the UE's 804 antenna(s) transmit the RTT response signal 820. At the network node 802, there is a reception delay 824 between the time T_7 that the network node's 802 antenna(s) receive the RTT response signal 820 and the time T_8 that the network node's 802 baseband processes the RTT response signal 820.

The difference between times T_2 and T_1 (i.e., transmission delay 814) and times T_8 and T_7 (i.e., reception delay 824) is referred to as the network node's 802 "group delay." The difference between times T_4 and T_3 (i.e., reception delay 816) and times T_6 and T_5 (i.e., transmission delay 826) is referred to as the UE's 804 "group delay." The group delay includes a hardware group delay, a group delay attributable to software/firmware, or both. More specifically, although software and/or firmware may contribute to group delay, the group delay is primarily due to internal hardware delays between the baseband and the antenna(s) of the network node 802 and the UE 804.

As shown in FIG. 8, because of the reception delay 816 and the transmission delay 826, the UE's 804 Rx-Tx time difference measurement 812 does not represent the difference between the actual reception time at time T_3 and the actual transmission time at time T_6. Similarly, because of the transmission delay 814 and the reception delay 824, the network node's 802 Tx-Rx time difference measurement 822 does not represent the difference between the actual transmission time at time T_2 and the actual reception time at time T_7. Thus, as shown, group delays, such as reception delays 814 and 816 and transmission delays 824 and 826, can contribute to timing errors and/or calibration errors that can impact RTT measurements, as well as other measurements, such as TDOA, RSTD, etc. This can in turn can impact positioning performance. For example, in some designs, a 10 ns error will introduce three meters of error in the final location estimate.

In some cases, the UE 804 can calibrate its group delay and compensate for it so that the Rx-Tx time difference measurement 812 reflects the actual reception and transmission times from its antenna(s). Alternatively, the UE 804 can report its group delay to the positioning entity (if not the UE 804), which can then subtract the group delay from the Rx-Tx time difference measurement 812 when determining the final distance between the network node 802 and the UE 804. Similarly, the network node 802 may be able to compensate for it group delay in the Tx-Rx time difference measurement 822, or simply report the group delay to the positioning entity.

Figure 9:
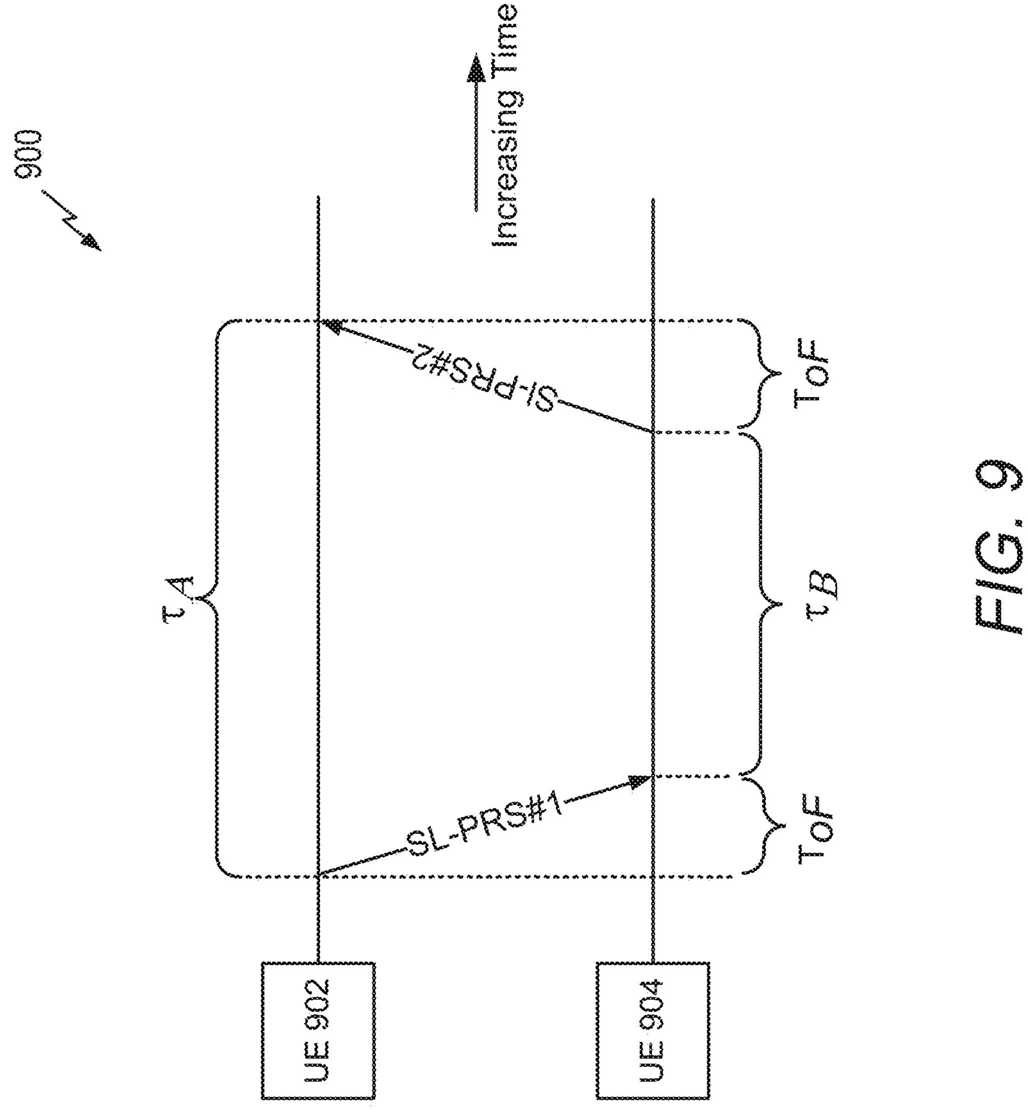
FIG. 9 illustrates a timing diagram of RTT measurement signals exchanged between UEs, according to aspects of the disclosure.

FIG. 9 illustrates a timing diagram 1100 of RTT measurement signals exchanged between UE 902 and UE 904, according to aspects of the disclosure. The timing diagram 900 of FIG. 9 is a variation of the timing diagram 700 of FIG. 7, whereby T_Prop is denoted as $T_{oF}$ (Time of Flight), T_Tx-Rx is denoted as $\tau_A$, T_Rx-Tx is denoted as $\tau_B$, signal 710 is denoted as SL-PRS #1, and signal 720 is denoted as SL-PRS #2.

Referring to FIG. 9, in some designs, RTT-based ranging/positioning (e.g., sidelink WIT between two sidelink UEs, or Uu-RTT RTT between UE and gNB) does not require accurate synchronization among different nodes, and clock drift of each node itself can be the dominant component of measurement error. For a single-round PRS exchanging (as in Rel-16/17 Uu-R), $\tau_A=2T_{oF}+\tau_B$ (where $T_{oF}$=RTT/2 is time-of-flight in single way, and $\tau_A$, $\tau_B$ are Rx-Tx time differences), clock drift can be modelled as $\hat{\tau}_A=(1+e_A)\tau_A=k_A\tau_A$ and $\hat{\tau}_B=(1+e_B)\tau_B=k_B\tau_B$, where $\hat{\tau}_A$ and $\hat{\tau}_B$ are measured Rx-Tx time differences $e_A$ or $e_B$ models the deviation from ideal time, and may be expressed in ppm/ppb (parts per million/billion). For an 5G NR UE, according to 38.101-1/2, the required clock drift is up to ±0.1 ppm (±100 ppb). For estimated $T_{oF}$ by $$\hat{T}_{oF}=\frac{1}{2}(\hat{\tau}_A-\hat{\tau}_B),$$

error is:

$$\hat{T}_{oF}-T_{oF}=$$

$$\frac{1}{2}(\hat{\tau}_A-\hat{\tau}_B)-\frac{1}{2}(\tau_A-\tau_B)=\frac{1}{2}(e_A\tau_A-e_B\tau_B)=e_AT_{oF}+\frac{\tau_B}{2}(e_A-e_B).$$

where $T_{oF}$ is at a level of tens of nanoseconds (for distances e.g. 3 to 30 meters), while $\tau_B$ is at a level of milliseconds—thus $$\frac{\tau_B}{2}(e_A-e_B)$$

is the dominant part of estimation error. Assuming $\tau_B$=100 ms, since the worst case of $e_A-e_B$ is ±0.2 ppm, the error can be 1.0 ns (3 meters in distance).

For Uu-based RTT in 3GPP Rel-16, a maximum PRS-to-SRS time is required between a DL-PRS and SRS for Rx-Tx time difference measurement. For example, a maximum PRS-to-SRS requirement in Uu-RTT of 25 ms corresponds to 75 cm ranging error due to this ±0.1 ppm time-drift. Similarly, in FIG. 9, a maximum time may also be required between SL-PRS #1 and SL-PRS #2 for Rx-Tx time difference measurement.

However, as the positioning accuracy requirements increase in 3GPP Rel-17/18, the required maximum SL-PRS #1-to-SL-PRS #2 can be small and may limit scheduling flexibility. For example, for Rel-16 accuracy (e.g., 3-10 meters), the max SL-PRS #1-to-SL-PRS #2 time can be:

$$\frac{3*10\%}{0.1\ \text{ppm}*c}=10\ \text{ms},$$

which may not be a very harsh requirement (here 10% is the error budget). However, as positioning requirements increase in Rel-17 (e.g., 1 in for general commercial use, or 20 cm for IIoT) the max SL-PRS #1-to-SL-PRS #2 time can be 3.3 ms or 0.66 ms—either impossible, or cause a shortage on SL-PRS capacity.

To this end, time-drift error compensation may be implemented, which may improve positioning accuracy even if SL-PRS #1-to-SL-PRS #2 time is relatively long.

Figure 10:
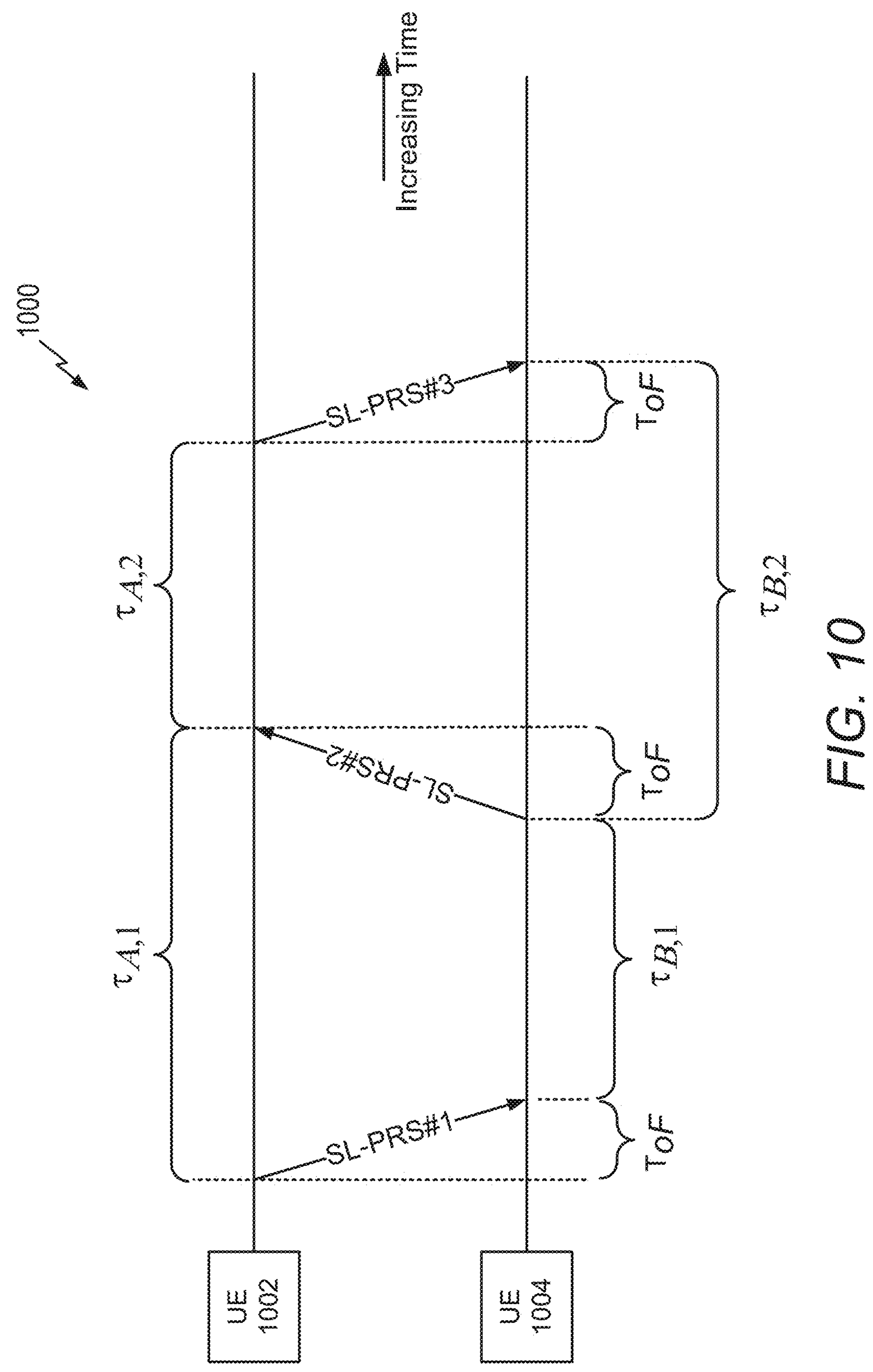
FIG. 10 illustrates a timing diagram of RTT measurement signals exchanged between UEs, according to aspects of the disclosure.

FIG. 10 illustrates a timing diagram 1000 of RTT measurement signals exchanged between UE 1002 and UE 1004, according to aspects of the disclosure. In contrast to FIG. 10, a first SL-PRS (i.e., SL-PRS #1) before SL-PRS #2 is paired with a second SL-PRS (i.e., SL-PRS #3) after SL-PRS #2.

Referring to FIG. 10, in some designs, the SL-PRS #1, SL-PRS #2 and SL-PRS #3 are symmetric (e.g., a slot offset between SL-PRS #1 and SL-PRS #2 is equal to a slot offset between SL-PRS #2 and SL-PRS #3). In this case, drift-mitigated $\hat{T}_{oF}$ may be calculated as:

$$\frac{1}{4}(\hat{\tau}_{A,1} - \hat{\tau}_{B,1} + \hat{\tau}_{B,2} - \hat{\tau}_{A,2})$$

where error of $\hat{T}_{oF}$ may be calculated as:

$$\frac{1}{2}T_{oF}(e_A + e_B) + \frac{1}{4}(e_A - e_B)(\tau_{B,1} - \tau_{A,2})$$

where the symmetric nature of SL-PRS #1, SL-PRS #2 and SL-PRS #3 mitigates the dominant part of the time-drift error (e.g., which makes scheduling flexibility more difficult, but improves latency).

Referring to FIG. 10, in other designs, the SL-PRS #1, SL-PRS #2 and SL-PRS #3 are asymmetric (e.g., a slot offset between SL-PRS #1 and SL-PRS #2 is not equal to a slot offset between SL-PRS #2 and SL-PRS #3). In this case, drift-mitigated $\hat{T}_{oF}$ may be calculated as:

$$\frac{\hat{\tau}_{A,1}\hat{\tau}_{B,2} - \hat{\tau}_{A,2}\hat{\tau}_{B,1}}{2(\hat{\tau}_{B,1} + \hat{\tau}_{B,2})} = \frac{1}{2}\left[\hat{\tau}_{A,1} - \frac{\hat{\tau}_{A,1} + \hat{\tau}_{A,2}}{\hat{\tau}_{B,1} + \hat{\tau}_{B,2}}\hat{\tau}_{B,1}\right]$$

where the drift-error reference duration is $\tau_1+\tau_2$, and where error of $\hat{T}_{oF}$ may be calculated as $e_A T_{oF}$, where the drift-correction reference duration is long enough to be effective so that the multiplication correction factor is not a constant 1 (e.g., which makes scheduling flexibility easier, but increases latency).

Figure 11:
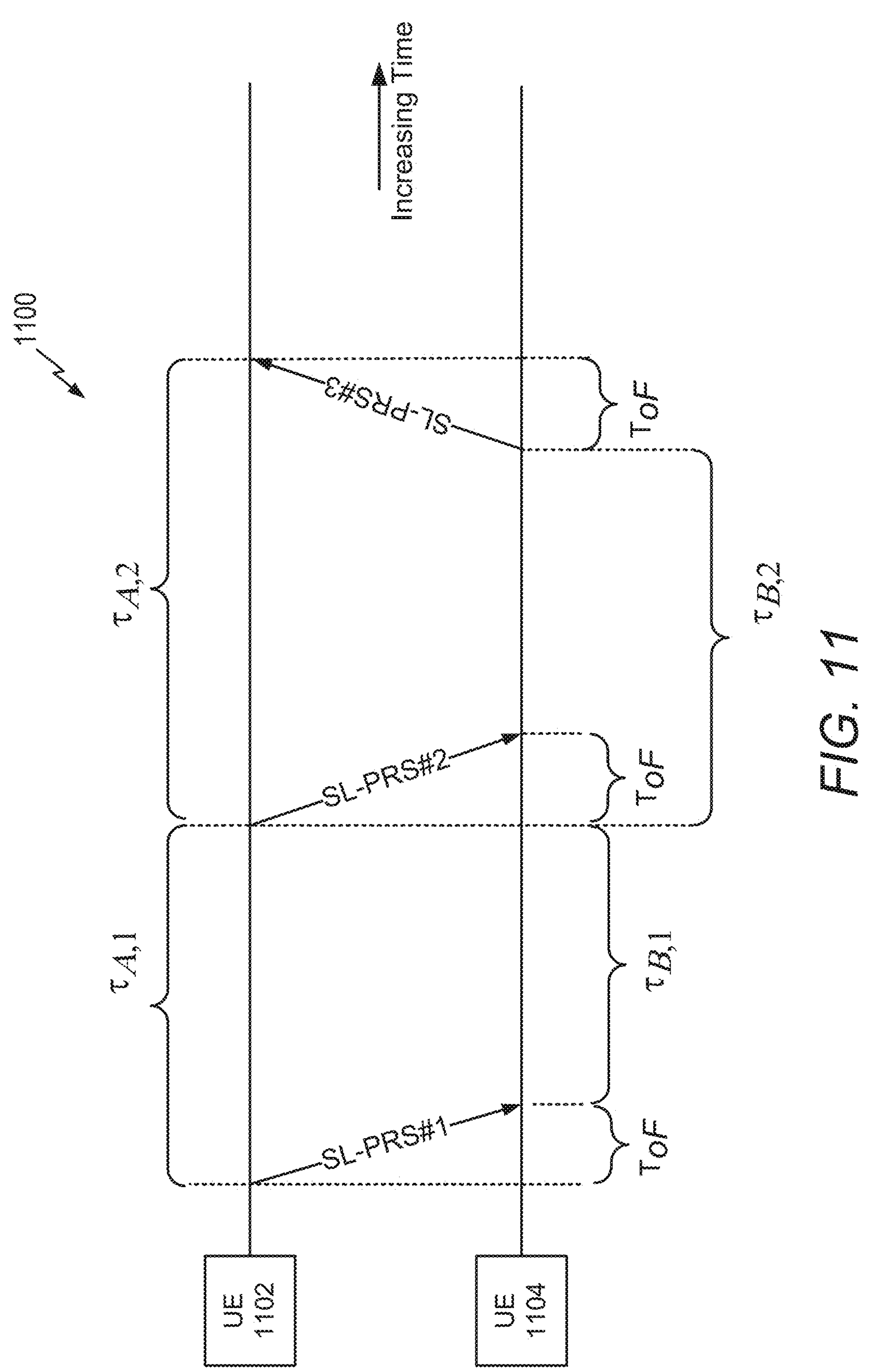
FIG. 11 illustrates a timing diagram of RTT measurement signals exchanged between UEs, according to aspects of the disclosure.

FIG. 11 illustrates a timing diagram 1100 of RTT measurement signals exchanged between UE 1102 and UE 1104, according to aspects of the disclosure. In contrast to FIG. 11, a first SL-PRS (i.e., SL-PRS #1) is paired with a second SL-PRS (i.e., SL-PRS #2) in the same transmission direction before a third SL-PRS (i.e., SL-PRS #3).

Referring to FIG. 11, in other designs, the SL-PRS #1, SL-PRS #2 and SL-PRS #3 are asymmetric (e.g., a slot offset between SL-PRS #1 and SL-PRS #3 is not equal to a slot offset between SL-PRS #2 and SL-PRS #3), In this case, drift-mitigated $\hat{T}_{oF}$ may be calculated as:

$$\frac{1}{2}\left(\hat{\tau}_{A,2} - \frac{\hat{\tau}_{A,1}}{\hat{\tau}_{B,1}}\hat{\tau}_{B,2}\right)$$

where the drift-error reference duration is $\tau_1$ and where error of $\hat{T}_{oF}$ may be calculated as $e_A T_{oF}$, where the drift-correction reference duration is long enough to be effective so that the multiplication correction factor is not a constant 1 (e.g., which makes scheduling flexibility easier, but increases latency).

Referring to FIGS. 10-11, it can be seen that multiple SL-PRS in the same transmission direction can be configured to mitigate the clock-drift issue noted above. However, resenting SL-PRS closely together in time SL-PRS "might not always be possible in SL. For example, slots allocated for SL (in a SL resource pool) can be sparse in time. Also, for SL resource allocation mode 2, the reservation procedure can have long latency. Also, SL-DRX may result in DRX-OFF periods where SL slots are unavailable.

Aspects of the disclosure are directed to a SL-PRS resource configuration for (at least) first, second and third SL-PRSs. In particular, two of the three SL-PRSs are configured in the same transmission direction. In some designs, the two SL-PRSs configured in the same transmission direction can be paired, with their respective timing measurements used for time-drift error mitigation as described above with respect to FIGS. 10-11 for example. Such aspects may provide various technical advantages, such as improved positioning accuracy due to time-drift compensation.

FIG. 12 illustrates an exemplary process 1200 of wireless communication, according to aspects of the disclosure. In an aspect, the process 1200 may be performed by a first UE, such as UE 302, UE 400, etc.

Referring to FIG. 12, at 1210, the first UE (e.g., receiver 312 or 322, processing system 332, PRS module 342, etc.) obtains a sidelink positioning reference signal (SL-PRS) resource configuration associated with a positioning measurement procedure that comprises a first SL-PRS between the first UE and a second UE in a first transmission direction, a second SL-PRS between the first UE and the second UE in the first transmission direction that is offset in time from the first SL-PRS by a time offset, and a third SL-PRS between the first UE and the second UE in a second transmission direction. In some designs, at 1210, the SL-PRS resource configuration is determined independently at the first UE and transmitted to the second UE. In other designs, at 1210, the SL-PRS resource configuration is received from the second UE. Hence, the first UE may correspond to either the initiator of the SL-PRS measurement procedure or the responder to the SL-PRS measurement procedure. In other designs, the first and/or second UEs may have a network connection, and the SL-PRS resource configuration may be received from a network component (e.g., gNB, LMF, etc.). In some designs, the first UE is a target UE for which a position estimate is to be derived in accordance with the positioning measurement procedure, and the second UE is associated with a known location. In other designs, the second UE is a target UE for which a position estimate is to be derived in accordance with the positioning measurement procedure, and the first UE is associated with a known location. In an example, a means for obtaining the SL-PRS resource configuration at 1210 may include receiver 312 or 322, processing system 332, PRS module 342, etc., of the first UE.

Referring to FIG. 12, at 1220, the first UE (e.g., receiver 312 or 322, transmitter 314 or 324, transceiver(s) 404, processor(s) 332 or 410, PRS module 342, etc.) performs the positioning measurement procedure with the second UE in accordance with the SL-PRS resource configuration (e.g., perform and optionally report one or more Rx-Tx measurements, etc.). In an example, a means for performing the positioning measurement procedure at 1220 the SL-PRS resource configuration at 1210 may include receiver 312, or 322, transmitter 314 or 324, transceivers) 404, processor(s) 332 or 410, PRS module 342, etc., of the first UE.

Figure 13:
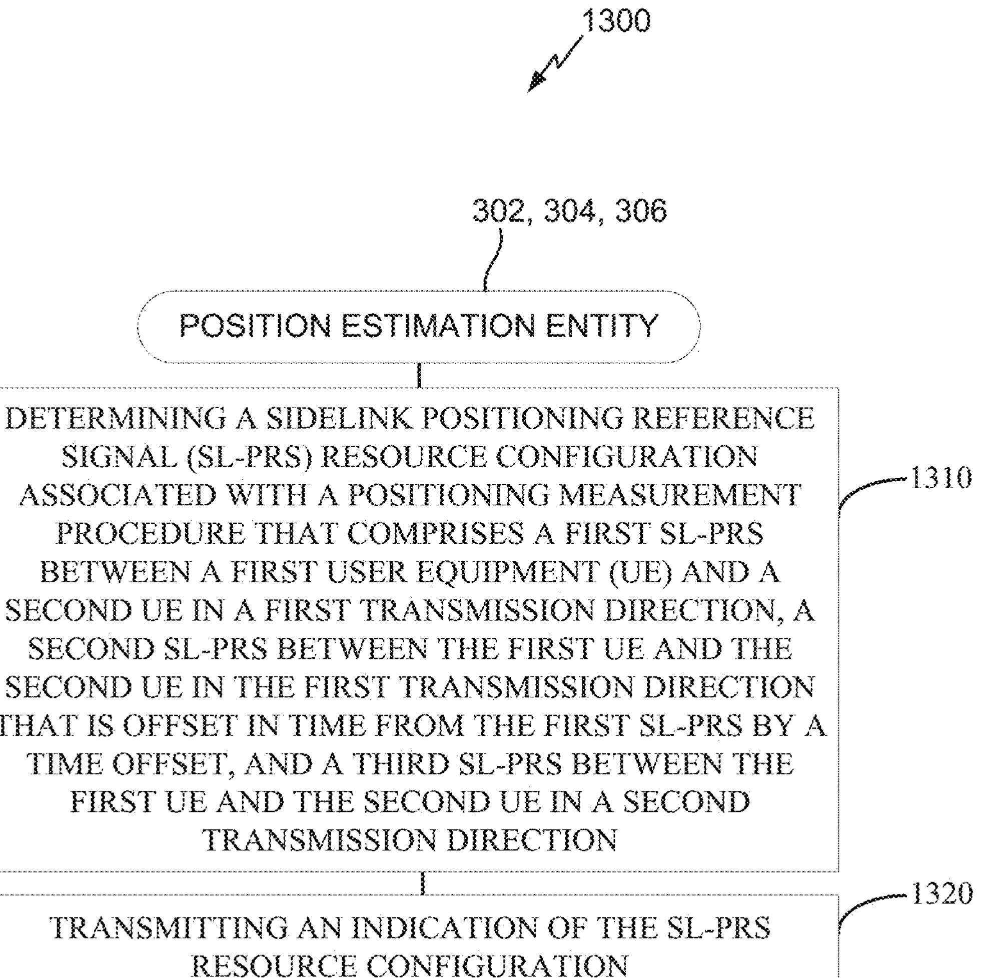
FIG. 13 illustrates an exemplary process of wireless communication, according to aspects of the disclosure.

FIG. 13 illustrates an exemplary process 1300 of wireless communication, according to aspects of the disclosure. In an aspect, the process 1300 may be performed by a position estimation entity, which may correspond to one of a UE (e.g., one of the first and second UEs), such as UE 302, UE 400, etc., or alternatively to a BS or gNB such as BS 304 (e.g., for LMF integrated in RAN), or a network entity 306 (e.g., core network component such as LMF or a location server). In the latter cases, despite the positioning measurement procedure being performed via sidelink, the measurement results may be reported to the network for position estimate derivation.

Referring to FIG. 13, at 1310, the position estimation entity (e.g., processor(s) 332 or 384 or 394 or 410, PRS module 342 or 388 or 398, etc.) determines a sidelink positioning reference signal (SL-PRS) resource configuration associated with a positioning measurement procedure that comprises a first SL-PRS between a first user equipment (UE) and a second UE in a first transmission direction, a second SL-PRS between the first UE and the second UE in the first transmission direction that is offset in time from the first SL-PRS by a time offset, and a third SL-PRS between the first UE and the second UE in a second transmission direction. In an example, a means for determining the SL-PRS resource configuration at 1310 may include processor(s) 332 or 384 or 394 or 410, PRS module 342 or 388 or 398, etc., of the position estimation entity.

Referring to FIG. 13, at 1320, the position estimation entity (e.g., transmitter 314 or 324 or 354 or 364, transceiver(s) 404, network interface(s) 380 or 390, etc.) transmits an indication of the SL-PRS resource configuration. The transmission at 1320 may either be a sidelink transmission between the first UE and the second UE, or alternatively a network transmission to the first UE and/or the second UE in case of managed sidelink. In an example, a means for performing the transmission at 1320 may include transmitter 314 or 324 or 354 or 364, transceiver(s) 404, network interface(s) 380 or 390, etc., of the position estimation entity.

Referring to FIGS. 12-13, in some designs, the SL-PRS resource configuration is determined independently at the first UE (e.g., first UE is position estimation entity) and transmitted to the second UE. In other designs, the SL-PRS resource configuration is received at the first UE from the second UE (e.g., second UE is position estimation entity).

Referring to FIGS. 12-13, in some designs, the first transmission direction is from the first UE to the second UE, such the first and second SL-PRSs are transmitted from the first UE to the second UE, and the third SL-PRS is transmitted from the second UE to the first UE. In context with FIGS. 10-11, in this scenario, the first UE may correspond to UE 1002 or 1102, and the second UE may correspond to UE 1004 or 1104.

Referring to FIGS. 12-13, in some designs, the first transmission direction is from the second UE to the first UE, such the first and second SL-PRSs are transmitted from the second UE to the first UE and the third SL-PRS is transmitted from the first UE to the second UE. In context with FIGS. 10-11, in this scenario, the second UE may correspond to UE 1002 or 1102, and the first UE may correspond to UE 1004 or 1104.

Referring to FIGS. 12-13, in some designs, the positioning measurement procedure includes measuring at least one Rx-Tx time difference associated with at least one of the first, second and third SL-PRSs. For example, if the first UE corresponds to UE 1002 or 1102, then the first UE measures SL-PRS #2. Alternatively, if the first UE corresponds to UE 1004 or 1104, then the first UE measures both SL-PRS #1 and SL-PRS #3 in FIG. 10 or SL-PRS #1 and SL-PRS #2 in FIG. 11.

Referring to FIGS. 12-13, in some designs, the third SL-PRS is earlier than the first and second SL-PRSs (e.g., while not expressly shown in FIGS. 10-11, in such an implementation, an initial initiator SL-PRS is followed by paired SL-PRS responses). In other designs, the third SL-PRS is later than the first and second SL-PRSs (e.g., see FIG. 11). In other designs, the third SL-PRS is between than the first and second SL-PRSs (e.g., see FIG. 10).

Referring to FIGS. 12-13, in some designs, the SL-PRS resource configuration is determined independently at the first UE and transmitted to the second UE and an earliest of the first, second and third SL-PRSs is transmitted by the first UE. In other designs, the SL-PRS resource configuration is received from the second UE, and the earliest of the first, second and third SL-PRSs is received at the first UE from the second UE. In either case, the earliest of the first, second and third SL-PRSs may be transmitted by the respective UE which initiates the positioning measurement procedure.

Referring to FIGS. 12-13, in some designs, the first, second and third SL-PRSs are scheduled aperiodically, semi-periodically, or periodically. An example of periodic SL-PRS will be described in more detail below with respect to FIG. 6.

Referring to FIGS. 12-13, in some designs, the first UE, the second UE, or both, may transmit a measurement report comprising measurement information that is based on one or more Rx-Tx time references associated with one or more of the first, second and third SL-PRSs. The measurement report(s) may be transmitted to a position estimation entity (e.g., one of the UEs, or a network component). In case of one of the UEs being the position estimation entity, the measurement report is used locally for position estimation, and need not be transmitted (except for an internal or logical transmission of the data between logical components of the respective UE).

Referring to FIGS. 12-13, in some designs, assume that the first UE is configured by the SL-PRS resource configuration to receive and measure the first and second SL-PRSs from the second UE. In some designs, the first UE performs respective Rx-Tx time difference measurements associated with the first and second SL-PRS, based on timestamps derived on the same time basis at the first UE, and then includes the respective measured Rx-Tx time differences in a measurement report. In some designs, there may be no timing advance (TA) adjustment between the respective timestamps associated with the respective measured Rx-Tx time differences. In a further example, if the respective Rx-Tx time differences are associated with different time bases (e.g., due to TA adjustment), the TA adjustment may be compensated for at the first UE or the position estimation entity. In other designs, the first and second SL-PRSs are transmitted (e.g., by the second UE) based on the same time basis.

Referring to FIGS. 12-13, in some designs as noted above, the first, second and third SL-FRSs may be scheduled periodically. In some designs, the first, second and third SL-PRSs are scheduled with the same respective periodicity. In a specific example, the time offset between the first and second SL-PRSs may correspond to half of the respective periodicity.

Referring to FIGS. 12-13, in some designs, the SL-PRS resource configuration is asymmetric such that a first time differential (e.g., first slot offset) between the third SL-PRS and the first SL-PRS is different than a second time differential (e.g., second slot offset) between the third SL-PRS and the second SL-PRS. In an example, the time offset is greater than a minimum time offset threshold associated with the asymmetric SL-PRS resource configuration. In a further example, the minimum time offset threshold may be based on a bandwidth associated with the first and second SL-PRSs.

Referring to FIGS. 12-13, in some designs as noted above, the position estimation entity may determine a clock drift between the first and second Rx-Tx time differences (e.g., as described above with respect to FIGS. 10-11). Once compensated for time drift, the measurement information associated with the positioning measurement procedure between the first and second UEs may be used to derive or determine a position estimate of one of the first and second UEs based at least in part upon the clock drift.

Figure 14:
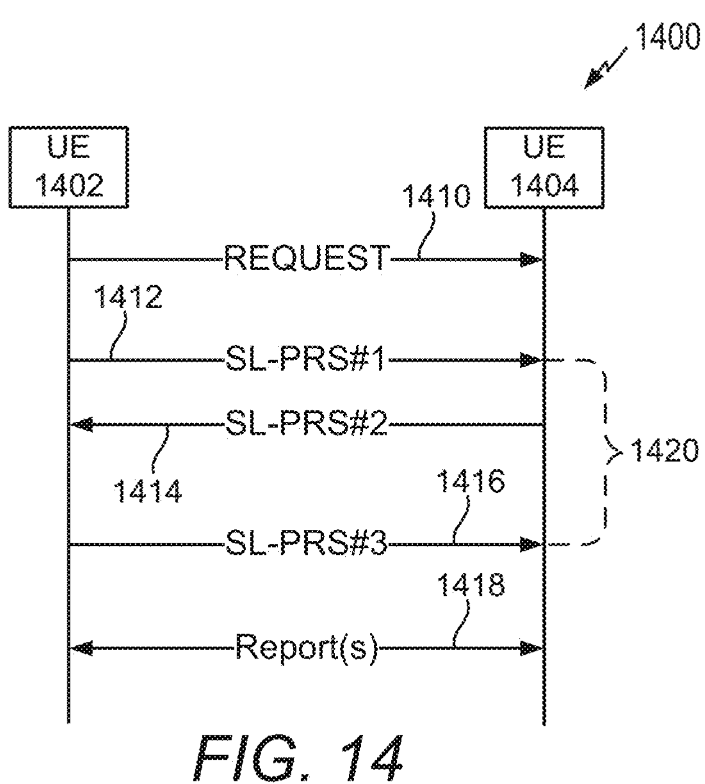
FIG. 14 illustrates an example implementation of the processes of FIGS. 12-13 in accordance with aspects of the disclosure.

FIG. 14 illustrates an example implementation of the processes 1200-1300 of FIGS. 12-13 in accordance with aspects of the disclosure. In FIG. 14, the first and second UEs may correspond to UEs 1402-1404, respectively, or alternatively to UEs 1404-1402, respectively. In FIG. 14, UE 1402 corresponds to the initiator of the positioning measurement procedure.

Referring to FIG. 14, at 1410, UE 1402 transmits a measurement request/reservation message to UE 1404. The measurement request/reservation message includes the SL-PRS resource configuration associated with the requested positioning measurement procedure. At 1412, UE 1402 transmits SL-PRS #1 to UE 1404 (e.g., which measures a timing associated with the arrival of SL-PRS #1 at UE 1404). At 1414, UE 1404 transmits SL-PRS #2 to UE 1402 (e.g., which measures a timing associated with the arrival of SL-PRS #2 at UE 1402). At 1416, UE 1402 transmits SL-PRS #3 to UE 1404 (e.g., which measures a timing associated with the arrival of SL-PRS #3 at UE 1404). At 1418, UEs 1402 and 1404 exchange measurement report(s). UE 1402, UE 1404, or both, may determine and compensate for a clock drift between SL-PRS #1 and SL-PRS #3, as noted at 1420. In some designs, the clock drift compensation of 1420 may be implemented as described above with respect to FIG. 10 (e.g., for symmetric or asymmetric scenario). In an example, a time gap (or slot offset) from SL-PRS #1 to SL-PRS #2 may be equal to that of SL-PRS #2 to SL-PRS #3 (e.g., for symmetric case with a lower latency, since a threshold or minimum time gap may not be required as in asymmetric case).

Figure 15:
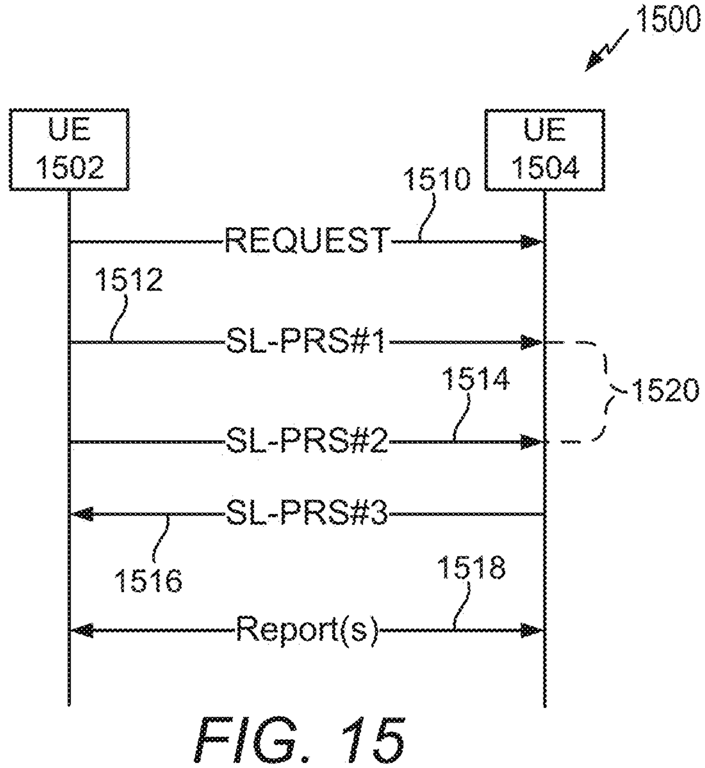
FIG. 15 illustrates an example implementation of the processes of FIGS. 12-13 in accordance with aspects of the disclosure.

FIG. 15 illustrates an example implementation of the processes 1200-1300 of FIGS. 12-13 in accordance with aspects of the disclosure. In FIG. 15, the first and second UEs may correspond to UEs 1502-1504, respectively, or alternatively to UEs 1504-1502, respectively. In FIG. 15, UE 1502 corresponds to the initiator of the positioning measurement procedure.

Referring to FIG. 15, at 1510, UE 1502 transmits a measurement request/reservation message to UE 1504. The measurement request/reservation message includes the SL-PRS resource configuration associated with the requested positioning measurement procedure. At 1512, UE 1502 transmits SL-PRS #1 to UE 1504 (e.g., which measures a timing associated with the arrival of SL-PRS #1 at UE 1504). At 514, UE 1502 transmits SL-PRS #2 to UE 1504 (e.g., which measures a timing associated with the arrival of SL-PRS #2 at UE 1504). At 1514, UE 1504 transmits SL-PRS #3 to UE 1502 (e.g., which measures a timing associated with the arrival of SL-PRS #3 at UE 1502). At 1518, UEs 1502 and 1504 exchange measurement report(s). UE 1502, UE 1504, or both, may determine and compensate for a clock drift between SL-PRS #1 and SL-PRS #2, as noted at 1520. In some designs, the clock drift compensation of 1520 may be implemented as described above with respect to FIG. 11 (e.g., for asymmetric scenario).

Figure 16:
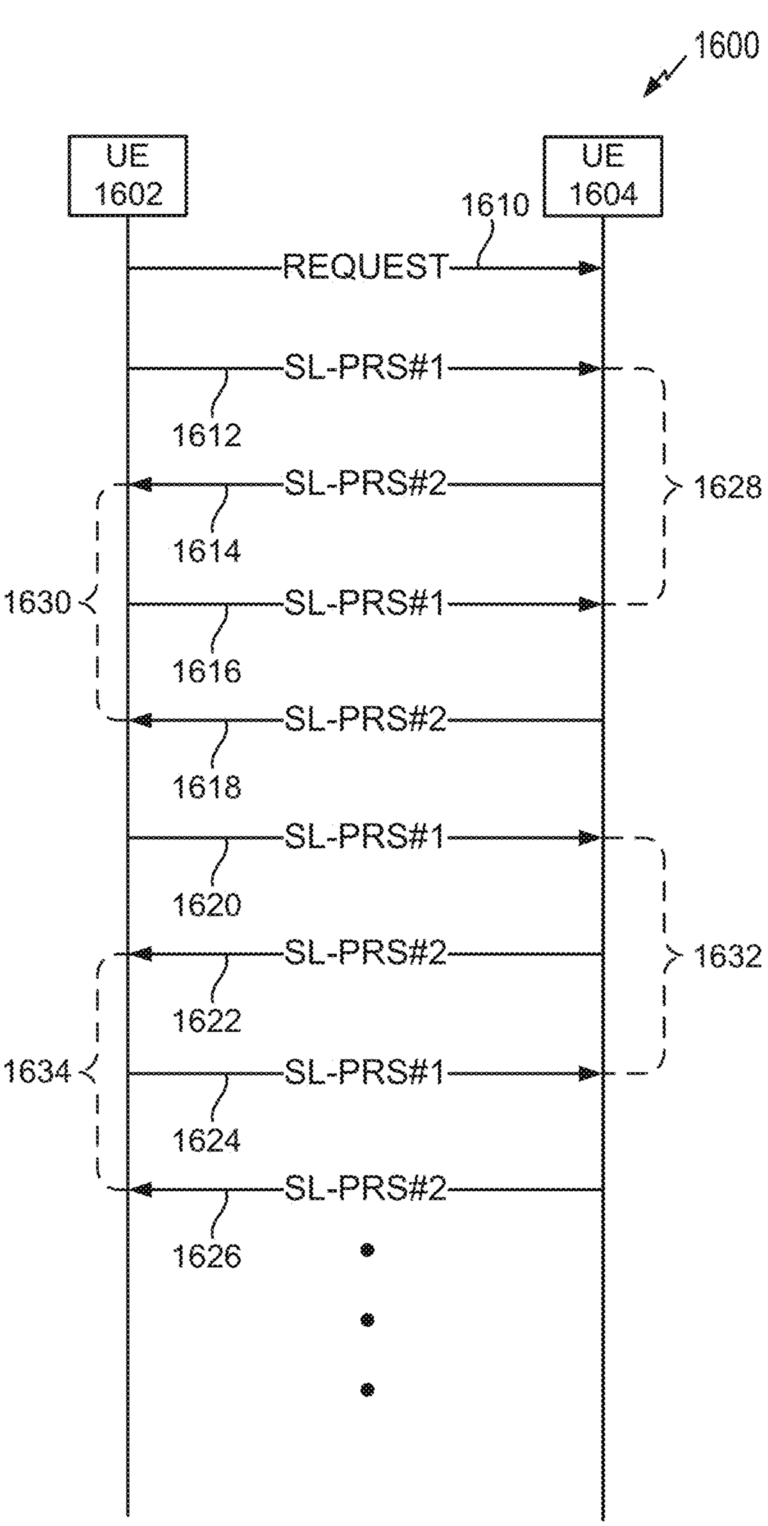
FIG. 16 illustrates an example implementation of the processes of FIGS. 12-13 in accordance with aspects of the disclosure.

FIG. 16 illustrates an example implementation of the processes 1200-1300 of FIGS. 12-13 in accordance with aspects of the disclosure. In FIG. 16, the first and second UEs may correspond to UEs 1602-1604, respectively, or alternatively to UEs 1604-1602, respectively. In FIG. 16, UE 1502 corresponds to the initiator of the positioning measurement procedure that is associated with periodic instances of SL-PRS #1 and SL-PRS #2. For simplicity, FIG. 16 depicts the exchanges of SL-PRS without expressly showing the transmission of the associated measurement reports, which may occur on a periodic basis in some designs.

Referring to FIG. 16, at 1610, UE 1602 transmits a measurement request/reservation message to UE 1604. The measurement request/reservation message includes the SL-PRS resource configuration (e.g., periodic instances of SL-PRS #1 and SL-PRS #2) associated with the requested positioning measurement procedure. At 1612. UE 1602 transmits a first instance of SL-PRS #1 to UE 1604 (e.g., which measures a timing associated with the arrival of SL-PRS #1 at UE 1604). At 1614, UE 1604 transmits a first instance of SL-PRS #2 to UE 1602 (e.g., which measures a timing associated with the arrival of SL-PRS #2 at UE 1602). At 1616, UE 1602 transmits a second instance of SL-PRS #1 to UE 1606 (e.g., which measures a timing associated with the arrival of SL-PRS #1 at UE 1604). This back-and-forth of SL-PRS #1 and SL-PRS #2 may continue to repeat on a periodic basis, as shown at 1618, 1620, 1622, 1624 and 1626. While not shown. UEs 1602 and 1604 exchange measurement report(s). UE 1602, UE 1604, or both, may determine and compensate for a clock drift between paired instances of SL-PRS #1 or between paired instances of SL-PRS #2, as noted at 1628, 1630, 1632 and 1634. In some designs, the clock drift compensation at 1628, 1630, 1632 and 1634 may be implemented as described above with respect to FIG. 10 (e.g., for symmetric or asymmetric scenario).

Referring to FIG. 16 in more detail, in some designs the clock drift compensations at each of 1628, 1630, 1632 and 1634 may be based upon timestamps of measured Rx-Time time differences derived on the same time basis (e.g., without a TA adjustment interrupted). In FIG. 16, the request message at 1610 may be configured to reserve the periodic resources for SL-PRS #1 and SL-PRS #2. In some designs, SL-PRS #1 and SL-PRS #2 may have the same periodicity. As noted above, the initiating UE (i.e., the UE that transmits the request message which initiates the positioning procedure, which is UE 1602 in FIG. 16) may transmit the earliest SL-PRS (e.g., SL-PRS #1 at 1602). In some designs, the offset between the 2 periodic SL-PRS resources for SL-PRS #1 and SL-PRS #2 may be half of the periodicity (for symmetric algorithm with a lower latency)

Referring to FIGS. 12-13, in some designs, for aperiodic SL-PRS, the gap between the 2 SL-PRSs with a same transmission direction (e.g., paired SL-PRS instances which may be used for time-drift compensation may be separated by a minimum time gap or time threshold. Similarly, for periodic SL-PRS, the periodicity of the SL-PRS may be separated by a minimum time gap or time threshold. In some designs, the threshold may be conditional without an equal gap (since this would allow the symmetric algorithm, which may not require a threshold). In FIG. 14 for example, an equal gap means same gap for SL-PRS #1-to-SL-PRS #2 and SL-PRS #2-to-SL-PRS #3. For periodic case, an equal gap means offset between the 2 PRS resources is half of the periodicity of the PRS resources. In some designs, the threshold may decrease with SL-PRS bandwidth (e.g., paired SL-PRS can be closer together in time for lower bandwidths).

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an insulator and a conductor). Furthermore, it is also intended that aspects of a clause can be included in any other independent clause, even if the clause is not directly dependent on the independent clause.

Implementation examples are described in the following numbered clauses:

Clause 1. A method of operating a first user equipment (UE), comprising:

obtaining a sidelink positioning reference signal (SL-PRS) resource configuration associated with a positioning measurement procedure that comprises a first SL-PRS between the first UE and a second UE in a first transmission direction, a second SL-PRS between the first UE and the second UE in the first transmission direction that is offset in time from the first SL-PRS by a time offset, and a third SL-PRS between the first UE and the second UE in a second transmission direction; and performing the positioning measurement procedure with the second UE in accordance with the SL-PRS resource configuration.

Clause 2. The method of clause 1, wherein the SL-PRS resource configuration is determined independently at the first UE and transmitted to the second UE, or wherein the SL-PRS resource configuration is received from the second UE.

Clause 3. The method of any of clauses 1 to 2, wherein the first transmission direction is from the first UE to the second UE, such the first and second SL-PRSs are transmitted from the first UE to the second UE and the third SL-PRS is transmitted from the second UE to the first UE.

Clause 4. The method of any of clauses 1 to 3, wherein the first transmission direction is from the second UE to the first UE, such the first and second SL-PRSs are transmitted from the second UE to the first UE and the third SL-PRS is transmitted from the first UE to the second UE.

Clause 5. The method of any of clauses 1 to 4, wherein the positioning measurement procedure includes measuring at least one receive-transmit (Rx-Tx) nine difference associated with at least one of the first, second and third SL-PRSs.

Clause 6. The method of any of clauses 1 to 5, wherein the third SL-PRS is earlier than the first and second SL-PRSs, or wherein the third SL-PRS is later than the first and second SL-PRSs, or wherein the third SL-PRS is between than the first and second SL-PRSs.

Clause 7. The method of clause 6, wherein the SL-PRS resource configuration is determined independently at the first UE and transmitted to the second UE, and an earliest of the first, second and third SL-PRSs is transmitted by the first UE, or wherein the SL-PRS resource configuration is received from the second UE, and the earliest of the first, second and third SL-PRSs is received at the first UE from the second UE.

Clause 8. The method of any of clauses 1 to 7, wherein the first, second and third SL-PRSs are scheduled aperiodically, semi-periodically, or periodically.

Clause 9. The method of any of clauses 1 to 8, further comprising: transmitting a measurement report comprising measurement information that is based on one or more receive-transmit (Rx-Tx) time differences associated with one or more of the first, second and third SL-PRSs.

Clause 10. The method of clause 9, wherein the one or more Rx-Tx time differences associated with the first and second SL-PRSs in the measurement report are based on timestamps derived on the same time basis.

Clause 11. The method of any of clauses 9 to 10, wherein the first and second SL-PRSs are transmitted based on the same time basis.

Clause 12. The method of any of clauses 1 to 11, wherein the first, second and third SL-PRSs are scheduled periodically.

Clause 13. The method of clause 12, wherein the first, second and third SL-PRSs are scheduled with the same respective periodicity.

Clause 14. The method of clause 13, wherein the time offset between the first and second SL-PRSs corresponds to half of the respective periodicity.

Clause 15. The method of any of clauses 1 to 14, wherein the SL-PRS resource configuration is asymmetric such that a first time differential between the third SL-PRS and the first SL-PRS is different than a second time differential between the third SL-PRS and the second SL-PRS.

Clause 16. The method of clause 15, wherein the time offset is greater than a minimum time offset threshold associated with the asymmetric SL-PRS resource configuration.

Clause 17. The method of clause 16, wherein the minimum time offset threshold is based on a bandwidth associated with the first and second SL-PRSs.

Clause 18. A method of operating a position estimation entity, comprising: determining a sidelink positioning reference signal (SL-PRS) resource configuration associated with a positioning measurement procedure that comprises a first SL-PRS between a first user equipment (UE)) and a second UE in a first transmission direction, a second SL-PRS between the first UE and the second UE in the first transmission direction that is offset in time from the first SL-PRS by a time offset, and a third SL-PRS between the first UE and the second UE in a second transmission direction; and transmitting an indication of the SL-PRS resource configuration.

Clause 19. The method of clause 18, wherein the position estimation entity corresponds to the first UE, the second UE, a base station, a location server, or a location management function (LMF).

Clause 20. The method of any of clauses 18 to 19, further comprising: receiving, from the first UE or the second UE, a measurement report comprising measurement information that is based on a first receive-transmit (Rx-Tx) time difference associated with the first PRS by and a second Rx-Tx time difference associated with the second PRS in accordance with the SL-PRS resource configuration.

Clause 21. The method of clause 20, wherein the first and second SL-PRSs are transmitted based on the same time basis.

Clause 22. The method of any of clauses 20 to 21, further comprising: determining a clock drift between the first and second Rx-Tx time differences; and determining a position estimate of one of the first and second UEs based at least in part upon the clock drift.

Clause 23, The method of any of clauses 18 to 22, wherein the first transmission direction is from the first UE to the second UE, such the first and second SL-PRSs are transmitted from the first UE to the second UE and the third SL-PRS is transmitted from the second UE to the first UE.

Clause 24. The method of any of clauses 18 to 23, wherein the first transmission direction is from the second UE to the first UE, such the first and second SL-PRSs are transmitted from the second UE to the first UE and the third SL-PRS is transmitted from the first UE to the second UE.

Clause 25. The method of any of clauses 18 to 24, wherein the third SL-PRS is earlier than the first and second SL-PRSs, or wherein the third SL-PRS is later than the first and second SL-PRSs, or wherein the third SL-PRS is between than the first and second SL-PRSs.

Clause 26. The method of any of clauses 18 to 25, wherein the position estimation entity corresponds to the first UE, and an earliest of the first, second and third SL-PRSs is transmitted by the first UE, or wherein the position estimation entity corresponds to the second UE, and the earliest of the first, second and third SL-PRSs is received at the first UE from the second UE.

Clause 27. The method of any of clauses 18 to 26, wherein the SL-PRS resource configuration is asymmetric such that a first time differential between the third SL-PRS and the first SL-PRS is different than a second time differential between the third SL-PRS and the second SL-PRS.

Clause 28. The method of any of clauses 18 to 27, wherein the SL-PRS resource configuration is symmetric such that a first time differential between the third SL-PRS and the first SL-PRS is the same as a second time differential between the third SL-PRS and the second SL-PRS.

Clause 29. An apparatus comprising a memory, a communication interface, and at least one processor communicatively coupled to the memory and the communication interface, the memory, the communication interface, and the at least one processor configured to perform a method according to any of clauses 1 to 28.

Clause 30. An apparatus comprising means for performing a method according to any of clauses 1 to 28.

Clause 31. A non-transitory computer-readable medium storing computer-executable instructions, the computer-executable comprising at least one instruction for causing a computer or processor to perform a method according to any of clauses 1 to 28.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an ASIC, a field-programable gate array (FPGA), or other programmable logic device, discrete gate or transistor logic, discrete hardware components, or any combination thereof designed to perform the functions described herein, A general-purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of operating a first user equipment (UE), comprising:

obtaining a sidelink positioning reference signal (SL-PRS) resource configuration associated with a positioning measurement procedure that comprises a first SL-PRS between the first UE and a second UE in a first transmission direction, a second SL-PRS between the first UE and the second UE in the first transmission direction that is offset in time from the first SL-PRS by a time offset, and a third SL-PRS between the first UE and the second UE in a second transmission direction, wherein the SL-PRS resource configuration configures resources for the first SL-PRS, the second SL-PRS and the third SL-PRS; and performing the positioning measurement procedure with the second UE in accordance with the SL-PRS resource configuration.

2. The method of claim 1, wherein the SL-PRS resource configuration is determined independently at the first UE and transmitted to the second UE, or wherein the SL-PRS resource configuration is received from the second UE.

3. The method of claim 1, wherein the first transmission direction is from the first UE to the second UE, such the first and second SL-PRSs are transmitted from the first UE to the second UE and the third SL-PRS is transmitted from the second UE to the first UE.

4. The method of claim 1, wherein the first transmission direction is from the second UE to the first UE, such the first and second SL-PRSs are transmitted from the second UE to the first UE and the third SL-PRS is transmitted from the first UE to the second UE.

5. The method of claim 1, wherein the positioning measurement procedure includes measuring at least one receive-transmit (Rx-Tx) time difference associated with at least one of the first, second and third SL-PRSs.

6. The method of claim 1, wherein the third SL-PRS is earlier than the first and second SL-PRSs, or wherein the third SL-PRS is later than the first and second SL-PRSs, or wherein the third SL-PRS is between than the first and second SL-PRSs.

7. The method of claim 6, wherein the SL-PRS resource configuration is determined independently at the first UE and transmitted to the second UE, and an earliest of the first, second and third SL-PRSs is transmitted by the first UE, or wherein the SL-PRS resource configuration is received from the second UE, and the earliest of the first, second and third SL-PRSs is received at the first UE from the second UE.

8. The method of claim 1, wherein the first, second and third SL-PRSs are scheduled aperiodically, semi-periodically, or periodically.

9. The method of claim 1, further comprising:

transmitting a measurement report comprising measurement information that is based on one or more receive-transmit (Rx-Tx) time differences associated with one or more of the first, second and third SL-PRSs.

10. The method of claim 9, wherein the one or more Rx-Tx time differences associated with the first and second SL-PRSs in the measurement report are based on timestamps derived on the same time basis.

11. The method of claim 9, wherein the first and second SL-PRSs are transmitted based on the same time basis.

12. The method of claim 1, wherein the first, second and third SL-PRSs are scheduled periodically.

13. The method of claim 12, wherein the first, second and third SL-PRSs are scheduled with the same respective periodicity.

14. The method of claim 13, wherein the time offset between the first and second SL-PRSs corresponds to half of the respective periodicity.

15. The method of claim 1, wherein the SL-PRS resource configuration is asymmetric such that a first time differential between the third SL-PRS and the first SL-PRS is different than a second time differential between the third SL-PRS and the second SL-PRS.

16. The method of claim 15, wherein the time offset is greater than a minimum time offset threshold associated with the asymmetric SL-PRS resource configuration.

17. The method of claim 16, wherein the minimum time offset threshold is based on a bandwidth associated with the first and second SL-PRSs.

18. A method of operating a position estimation entity, comprising:

determining a sidelink positioning reference signal (SL-PRS) resource configuration associated with a positioning measurement procedure that comprises a first SL-PRS between a first user equipment (UE) and a second UE in a first transmission direction, a second SL-PRS between the first UE and the second UE in the first transmission direction that is offset in time from the first SL-PRS by a time offset, and a third SL-PRS between the first UE and the second UE in a second transmission direction, wherein the SL-PRS resource configuration configures resources for the first SL-PRS, the second SL-PRS and the third SL-PRS; and transmitting an indication of the SL-PRS resource configuration.

19. The method of claim 18, wherein the position estimation entity corresponds to the first UE, the second UE, a base station, a location server, or a location management function (LMF).

20. The method of claim 18, further comprising:

receiving, from the first UE or the second UE, a measurement report comprising measurement information that is based on a first receive-transmit (Rx-Tx) time difference associated with the first PRS by and a second Rx-Tx time difference associated with the second PRS in accordance with the SL-PRS resource configuration.

21. The method of claim 20,
wherein the first and second SL-PRSs are transmitted based on the same time basis.

22. The method of claim 20, further comprising:
determining a clock drift between the first and second Rx-Tx time differences; and
determining a position estimate of one of the first and second UEs based at least in part upon the clock drift.

23. The method of claim 18, wherein the first transmission direction is from the first UE to the second UE, such the first and second SL-PRSs are transmitted from the first UE to the second UE and the third SL-PRS is transmitted from the second UE to the first UE.

24. The method of claim 18, wherein the first transmission direction is from the second UE to the first UE, such the first and second SL-PRSs are transmitted from the second UE to the first UE and the third SL-PRS is transmitted from the first UE to the second UE.

25. The method of claim 18,
wherein the third SL-PRS is earlier than the first and second SL-PRSs, or
wherein the third SL-PRS is later than the first and second SL-PRSs, or
wherein the third SL-PRS is between than the first and second SL-PRSs.

26. The method of claim 18,
wherein the position estimation entity corresponds to the first UE, and an earliest of the first, second and third SL-PRSs is transmitted by the first UE, or
wherein the position estimation entity corresponds to the second UE, and the earliest of the first, second and third SL-PRSs is received at the first UE from the second UE.

27. The method of claim 18, wherein the SL-PRS resource configuration is asymmetric such that a first time differential between the third SL-PRS and the first SL-PRS is different than a second time differential between the third SL-PRS and the second SL-PRS.

28. The method of claim 18, wherein the SL-PRS resource configuration is symmetric such that a first time differential between the third SL-PRS and the first SL-PRS is the same as a second time differential between the third SL-PRS and the second SL-PRS.

29. A first user equipment (UE), comprising:
a memory;
a communication interface; and
at least one processor communicatively coupled to the memory and the communication interface, the at least one processor configured to:
obtain a sidelink positioning reference signal (SL-PRS) resource configuration associated with a positioning measurement procedure that comprises a first SL-PRS between the first UE and a second UE in a first transmission direction, a second SL-PRS between the first UE and the second UE in the first transmission direction that is offset in time from the first SL-PRS by a time offset, and a third SL-PRS between the first UE and the second UE in a second transmission direction, wherein the SL-PRS resource configuration configures resources for the first SL-PRS, the second SL-PRS and the third SL-PRS; and
perform the positioning measurement procedure with the second UE in accordance with the SL-PRS resource configuration.

30. The first UE of claim 29,
wherein the SL-PRS resource configuration is determined independently at the first UE and transmitted to the second UE, or
wherein the SL-PRS resource configuration is received from the second UE.

31. The first UE of claim 29, wherein the first transmission direction is from the first UE to the second UE, such the first and second SL-PRSs are transmitted from the first UE to the second UE and the third SL-PRS is transmitted from the second UE to the first UE.

32. The first UE of claim 29, wherein the first transmission direction is from the second UE to the first UE, such the first and second SL-PRSs are transmitted from the second UE to the first UE and the third SL-PRS is transmitted from the first UE to the second UE.

33. The first UE of claim 29, wherein the positioning measurement procedure includes measuring at least one receive-transmit (Rx-Tx) time difference associated with at least one of the first, second and third SL-PRSs.

34. The first UE of claim 29,
wherein the third SL-PRS is earlier than the first and second SL-PRSs, or
wherein the third SL-PRS is later than the first and second SL-PRSs, or
wherein the third SL-PRS is between than the first and second SL-PRSs.

35. The first UE of claim 34,
wherein the SL-PRS resource configuration is determined independently at the first UE and transmitted to the second UE, and an earliest of the first, second and third SL-PRSs is transmitted by the first UE, or
wherein the SL-PRS resource configuration is received from the second UE, and the earliest of the first, second and third SL-PRSs is received at the first UE from the second UE.

36. The first UE of claim 29, wherein the first, second and third SL-PRSs are scheduled aperiodically, semi-periodically, or periodically.

37. The first UE of claim 29, wherein the at least one processor is further configured to:
cause the communication interface to transmit a measurement report comprising measurement information that is based on one or more receive-transmit (Rx-Tx) time differences associated with one or more of the first, second and third SL-PRSs.

38. The first UE of claim 37, wherein the one or more Rx-Tx time differences associated with the first and second SL-PRSs in the measurement report are based on timestamps derived on the same time basis.

39. The first UE of claim 37,
wherein the first and second SL-PRSs are transmitted based on the same time basis.

40. The first UE of claim 29, wherein the first, second and third SL-PRSs are scheduled periodically.

41. The first UE of claim 40, wherein the first, second and third SL-PRSs are scheduled with the same respective periodicity.

42. The first UE of claim 41, wherein the time offset between the first and second SL-PRSs corresponds to half of the respective periodicity.

43. The first UE of claim 29, wherein the SL-PRS resource configuration is asymmetric such that a first time differential between the third SL-PRS and the first SL-PRS is different than a second time differential between the third SL-PRS and the second SL-PRS.

44. The first UE of claim 43, wherein the time offset is greater than a minimum time offset threshold associated with the asymmetric SL-PRS resource configuration.

45. The first UE of claim 44, wherein the minimum time offset threshold is based on a bandwidth associated with the first and second SL-PRSs.

46. A position estimation entity, comprising:

a memory;

a communication interface; and at least one processor communicatively coupled to the memory and the communication interface, the at least one processor configured to:

determine a sidelink positioning reference signal (SL-PRS) resource configuration associated with a positioning measurement procedure that comprises a first SL-PRS between a first user equipment (UE) and a second UE in a first transmission direction, a second SL-PRS between the first UE and the second UE in the first transmission direction that is offset in time from the first SL-PRS by a time offset, and a third SL-PRS between the first UE and the second UE in a second transmission direction, wherein the SL-PRS resource configuration configures resources for the first SL-PRS, the second SL-PRS and the third SL-PRS; and cause the communication interface to transmit an indication of the SL-PRS resource configuration.

47. The position estimation entity of claim 46, wherein the position estimation entity corresponds to the first UE, the second UE, a base station, a location server, or a location management function (LMF).

48. The position estimation entity of claim 46, wherein the at least one processor is further configured to:

receive, via the communication interface, from the first UE or the second UE, a measurement report comprising measurement information that is based on a first receive-transmit (Rx-Tx) time difference associated with the first PRS by and a second Rx-Tx time difference associated with the second PRS in accordance with the SL-PRS resource configuration.

49. The position estimation entity of claim 48, wherein the first and second SL-PRSs are transmitted based on the same time basis.

50. The position estimation entity of claim 48, wherein the at least one processor is further configured to:

determine a clock drift between the first and second Rx-Tx time differences; and determine a position estimate of one of the first and second UEs based at least in part upon the clock drift.

51. The position estimation entity of claim 46, wherein the first transmission direction is from the first UE to the second UE, such the first and second SL-PRSs are transmitted from the first UE to the second UE and the third SL-PRS is transmitted from the second UE to the first UE.

52. The position estimation entity of claim 46, wherein the first transmission direction is from the second UE to the first UE, such the first and second SL-PRSs are transmitted from the second UE to the first UE and the third SL-PRS is transmitted from the first UE to the second UE.

53. The position estimation entity of claim 46, wherein the third SL-PRS is earlier than the first and second SL-PRSs, or wherein the third SL-PRS is later than the first and second SL-PRSs, or wherein the third SL-PRS is between than the first and second SL-PRSs.

54. The position estimation entity of claim 46, wherein the position estimation entity corresponds to the first UE, and an earliest of the first, second and third SL-PRSs is transmitted by the first UE, or wherein the position estimation entity corresponds to the second UE, and the earliest of the first, second and third SL-PRSs is received at the first UE from the second UE.

55. The position estimation entity of claim 46, wherein the SL-PRS resource configuration is asymmetric such that a first time differential between the third SL-PRS and the first SL-PRS is different than a second time differential between the third SL-PRS and the second SL-PRS.

56. The position estimation entity of claim 46, wherein the SL-PRS resource configuration is symmetric such that a first time differential between the third SL-PRS and the first SL-PRS is the same as a second time differential between the third SL-PRS and the second SL-PRS.

* * * * *